United States Patent
Storm et al.

(10) Patent No.: US 11,266,058 B2
(45) Date of Patent: Mar. 8, 2022

(54) AUTOMATED CHECK STRIPS

(71) Applicant: Deere & Company, Moline, IL (US)

(72) Inventors: Brian Storm, Urbandale, IA (US); Cowan L. Wasser, Des Moines, IA (US); Jonathan D. Fauser, Urbandale, IA (US); Douglas J. Feldmann, Urbandale, IA (US); Ray M. Scheufler, Johnston, IA (US); Matt P. Stemper, Urbandale, IA (US); Darin S Krantz, Adel, IA (US)

(73) Assignee: Deere & Company, Moline, IL (US)

( * ) Notice: Subject to any disclaimer, the term of this patent is extended or adjusted under 35 U.S.C. 154(b) by 305 days.

(21) Appl. No.: 16/550,526

(22) Filed: Aug. 26, 2019

(65) Prior Publication Data

US 2021/0059096 A1 Mar. 4, 2021

(51) Int. Cl.
| | | |
|---|---|---|
| A01B 69/00 | (2006.01) | |
| G06F 16/29 | (2019.01) | |
| A01B 79/00 | (2006.01) | |
| A01C 21/00 | (2006.01) | |
| G05D 1/02 | (2020.01) | |

(52) U.S. Cl.
CPC .......... *A01B 69/001* (2013.01); *A01B 79/005* (2013.01); *A01C 21/005* (2013.01); *G05D 1/0276* (2013.01); *G06F 16/29* (2019.01); *G05D 2201/0201* (2013.01)

(58) Field of Classification Search
CPC ... A01B 69/001; A01B 79/005; A01C 21/005; G05D 1/0276; G05D 2201/0201; G06F 16/29
See application file for complete search history.

(56) References Cited

U.S. PATENT DOCUMENTS

| | | | | |
|---|---|---|---|---|
| 5,561,250 A | * | 10/1996 | Myers | A01C 7/105 |
| | | | | 73/861.73 |
| 5,936,234 A | * | 8/1999 | Thomas | A01C 7/105 |
| | | | | 250/222.2 |
| 6,070,539 A | * | 6/2000 | Flamme | A01C 21/005 |
| | | | | 111/177 |
| 6,226,969 B1 | * | 5/2001 | Becker | A01D 45/021 |
| | | | | 56/62 |
| 6,863,006 B2 | * | 3/2005 | Sandoval | A01C 19/04 |
| | | | | 111/200 |
| 10,123,474 B2 | | 11/2018 | Freiberg et al. | |
| 2010/0010667 A1 | * | 1/2010 | Sauder | A01C 7/04 |
| | | | | 700/231 |

(Continued)

FOREIGN PATENT DOCUMENTS

AU 2015268699 B2 12/2016

OTHER PUBLICATIONS

European Search Report issued in counterpart application No. 20189970.5 dated Jan. 25, 2021 (08 pages).

*Primary Examiner* — Calvin Cheung
(74) *Attorney, Agent, or Firm* — Joseph R. Kelly; Kelly, Holt & Christenson PLLC

(57) ABSTRACT

An agricultural machine performs a prescribed agricultural operation in a field. The machine is controlled to change the agricultural operation to a check strip operation. A location where the check strip operation is commenced is sensed and a location where the check strip operation ceases is also sensed. A dimension of the check strip, and its location, are stored.

22 Claims, 16 Drawing Sheets

(56) References Cited

U.S. PATENT DOCUMENTS

| | | | |
|---|---|---|---|
| 2011/0270529 A1 | 11/2011 | Macy et al. | |
| 2013/0124055 A1* | 5/2013 | Baurer | A01C 7/107 |
| | | | 701/50 |
| 2014/0002489 A1* | 1/2014 | Sauder | A01B 79/005 |
| | | | 345/629 |
| 2014/0277959 A1* | 9/2014 | Wagers | A01C 21/005 |
| | | | 701/50 |
| 2014/0297242 A1* | 10/2014 | Sauder | G06F 30/20 |
| | | | 703/6 |
| 2016/0057922 A1 | 3/2016 | Freiberg et al. | |
| 2019/0057461 A1 | 2/2019 | Ruff et al. | |
| 2020/0113169 A1* | 4/2020 | Jelenkovic | A01B 76/00 |

* cited by examiner

AUTOMATED CHECK STRIPS

FIELD OF THE DESCRIPTION

The present description relates to agricultural operations. More specifically, the present description relates to controlling a machine to automatically perform check strip operations in an agricultural field.

BACKGROUND

There are a wide variety of different types of agricultural machines that perform different types of agricultural operations. For example, there are a variety of different types of planting machines that plant crops. There are also post-planting machines that perform post-planting operations, such as spraying or applying materials to the field, after it is planted, and harvesting machines that perform harvesting operations. Similarly, there are post-harvest machines that perform post-harvest operations, such as tillage operations, etc.

These machines often operate in a prescribed manner over an entire field. However, in some current systems, the machine operation is changed over specific areas of an agricultural field in order to compare the results of the prescribed operation with the results of the changed operation. These areas are often referred to as check strips.

By way of example, a planter may operate over an agricultural field planting seeds at a prescribed (or default) variable seed rate. However, at certain, pre-defined locations (in check strips), the planter may be controlled to change the seed rate to a second seed rate that is higher or lower (or otherwise different) than the prescribed or default seed rate. Then, during harvest, the yield in the check strips can be compared to the yield in the remainder of the field to determine whether a different prescribed seed rate should be used in later planting operations. This is just one example of how a check strip can be used.

The discussion above is merely provided for general background information and is not intended to be used as an aid in determining the scope of the claimed subject matter.

SUMMARY

An agricultural machine performs a prescribed agricultural operation in a field. The machine is controlled to change the agricultural operation to a check strip operation. A location where the check strip operation is commenced is sensed and a location where the check strip operation ceases is also sensed. A dimension of the check strip, and its location, are stored.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
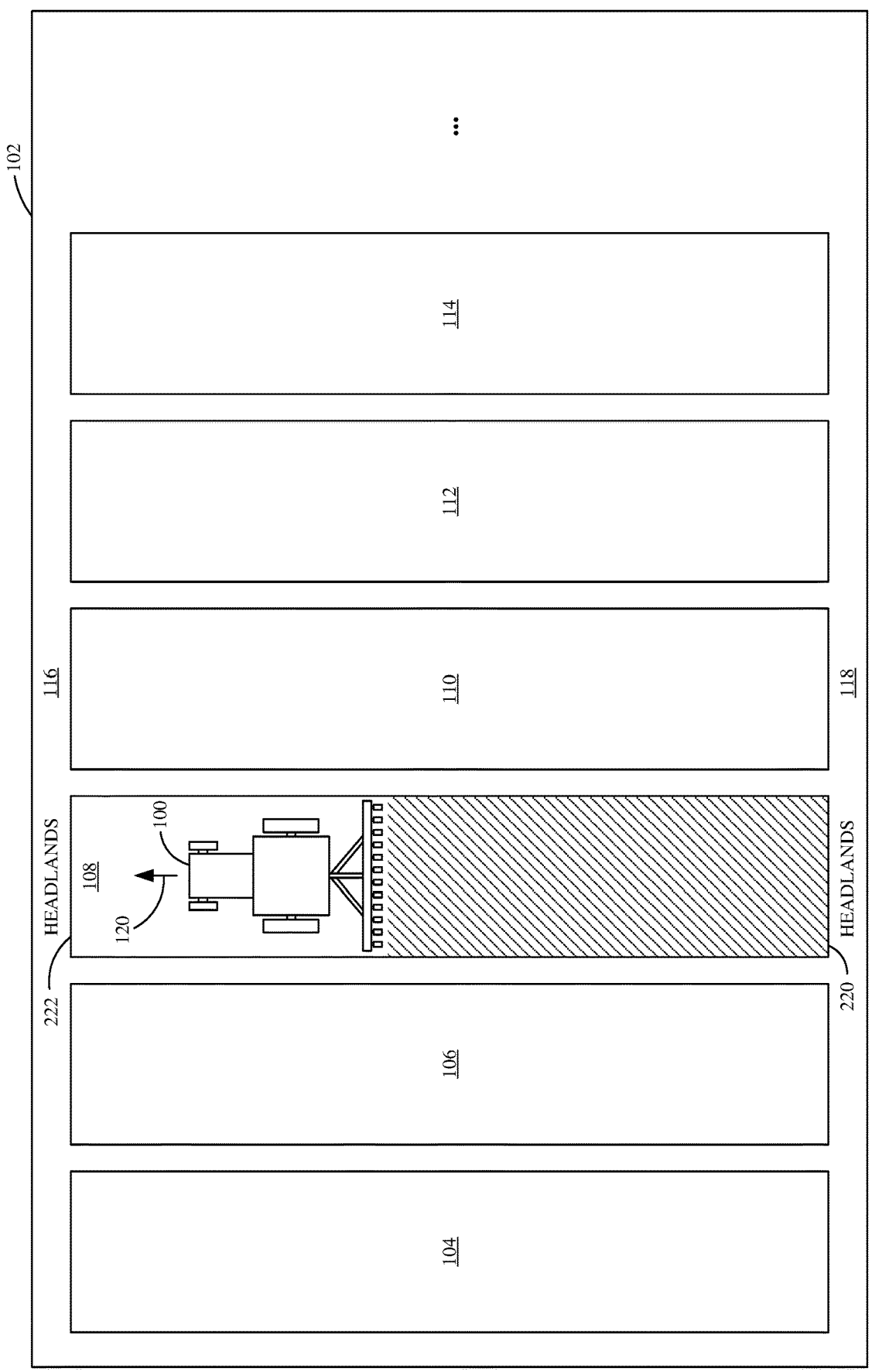
FIG. 1 is a pictorial illustration showing a planting machine planting an agricultural field with a check strip every third pass.

Agricultural operators (e.g., farmers) are commonly looking for ways to understand the impact of their farming practices on yield. It can be very difficult to understand whether a seed or fertilizer prescription is effective or whether a better alternative exists. Many agricultural operators have thus resorted to using check strips in their field.

In order to implement a check strip, the agricultural operator often manually changes the operation in some ways so that it deviates from the prescribed operation to see how a different operation performs under similar conditions relative to the prescribed operation. For example, the prescribed operation may be planting using a variable rate prescription. That may be changed, when planting check strips, to a fixed seed rate.

However, planting check strips in this way presents a number of different problems. Executing these check strips is difficult, because it requires the operator to manually change control of agricultural machine so that it performs the check strip operation. The operator must also note the location where the check strip resides so that the operator can correlate yield information to the check strip in order to perform post-harvest analysis.

Some current systems use check strips in combination with automatic guidance systems. In such systems, the operator preconfigures the location of check strips within a field. Then, when the agricultural planting machine arrives at that location, the operator overrides the current default, prescription (or non-check strip behavior) in favor of the changed prescription (the check strip behavior). This also required manual intervention which can be error prone and distracting.

Other current systems have used a guidance system to pre-locate check strips in the field, and when the machine enters the check strip, the operation of the machine is automatically modified to the check strip operation. This also presents a number of different problems. Because the check strips are pre-defined in the field, there is a relatively large likelihood that the agricultural machine will be misaligned with the check strip location, as it approaches the check strip location. For instance, if the machine is a planting machine, it is likely that only a part of the planting machine will be actually in the check strip location. Then, if check strip operation (e.g., flat seed rate) is commenced, part of the field adjacent the check strip will also have the flat seed rate. Therefore, a comparison of the yield in the check strip with a comparison of the yield in the areas adjacent the check strip will be less meaningful in determining whether the check strip operation was more or less effective. This is because it is difficult to have the machine well aligned with the pre-located check strip.

The present description thus proceeds with respect to a system that does not pre-locate the check strips in the field. Instead, as the machine is operating in the field, a check strip operation commences. At that point, the location of the machine is detected, and the machine dimensions are either sensed or otherwise known. The check strip operation continues until it is determined that the check strip should end. At that point, when the check strip operation ceases, again the location of the machine is detected, and the prescribed (or non-check strip) operation is again commenced. In this way, the precise location and dimension of the check strips is known because it is detected when the machine actually performs it.

For instance, if a planting machine is planting a check strip, the planting machine is controlled to change the seed rate to the check strip seed rate, and, when that happens, the location of the machine is detected. When the prescribed operation is to commence again, the machine is controlled to return to the prescribed seed rate. Again, when that happens, the location of the machine is detected. Because the dimensions of the machine are also known, and the location of the beginning of the check strip and the ending of the check strip are known, the precise location and dimensions of the check strip are known. Therefore, the yield detected in the check strip can be compared to yield in areas outside the check strip, in a meaningful way.

FIG. 1 is a pictorial illustration showing one example of a planting machine 100 performing a planting operation in an agricultural field 102. The planting machine 100 plants the agricultural field in a number of different passes that are labeled passes 104, 106, 108, 110, 112, and 114. It also plants in headland areas 116 and 118. In the example shown in FIG. 1, planting machine 100 is traveling in the direction indicated by arrow 120 and is planting a check strip throughout the entire pass 108. This is indicated by the crosshatched area behind planting machine 100 in pass 108. This check strip configuration may occur, for instance, when machine 100 is planting a check strip every third pass through field 102.

Figure 2:
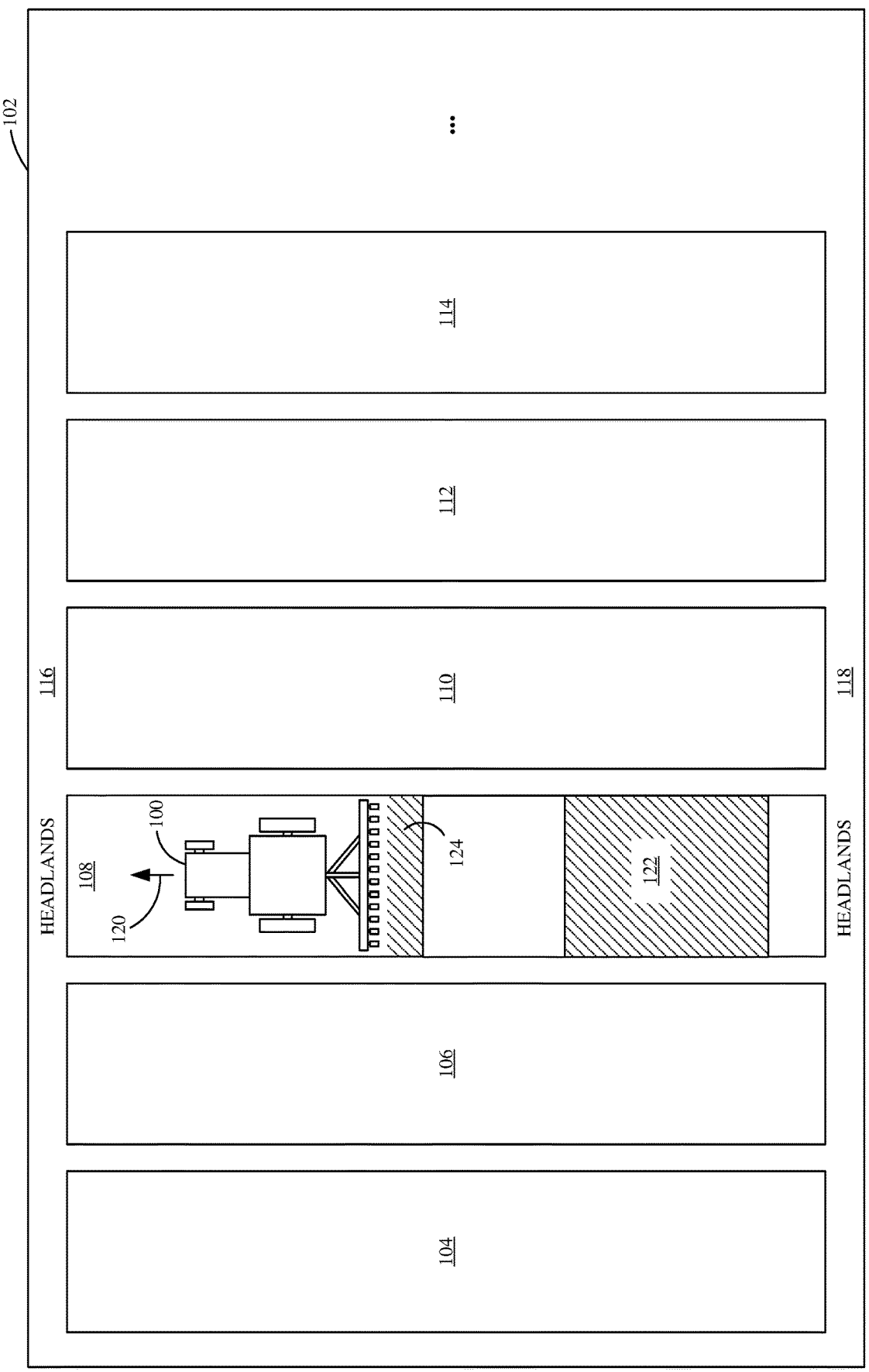
FIG. 2 is a pictorial illustration showing a planting machine planting multiple check strips in a single pass.

FIG. 2 is a pictorial illustration that shows a different check strip configuration. Some of the items in FIG. 2 are similar to those shown in FIG. 1, and they are similarly numbered. However, FIG. 2 shows that planting machine 100 is not planting a check strip in an entire pass 108, but it is instead planting multiple check strips 122 and 124 in pass 108. The remainder of the area in pass 108 is planted using the prescribed operation, instead of the check strip operation.

There are a wide variety of other ways that check strips can be planted. FIGS. 1 and 2 show only two examples.

Figure 3:
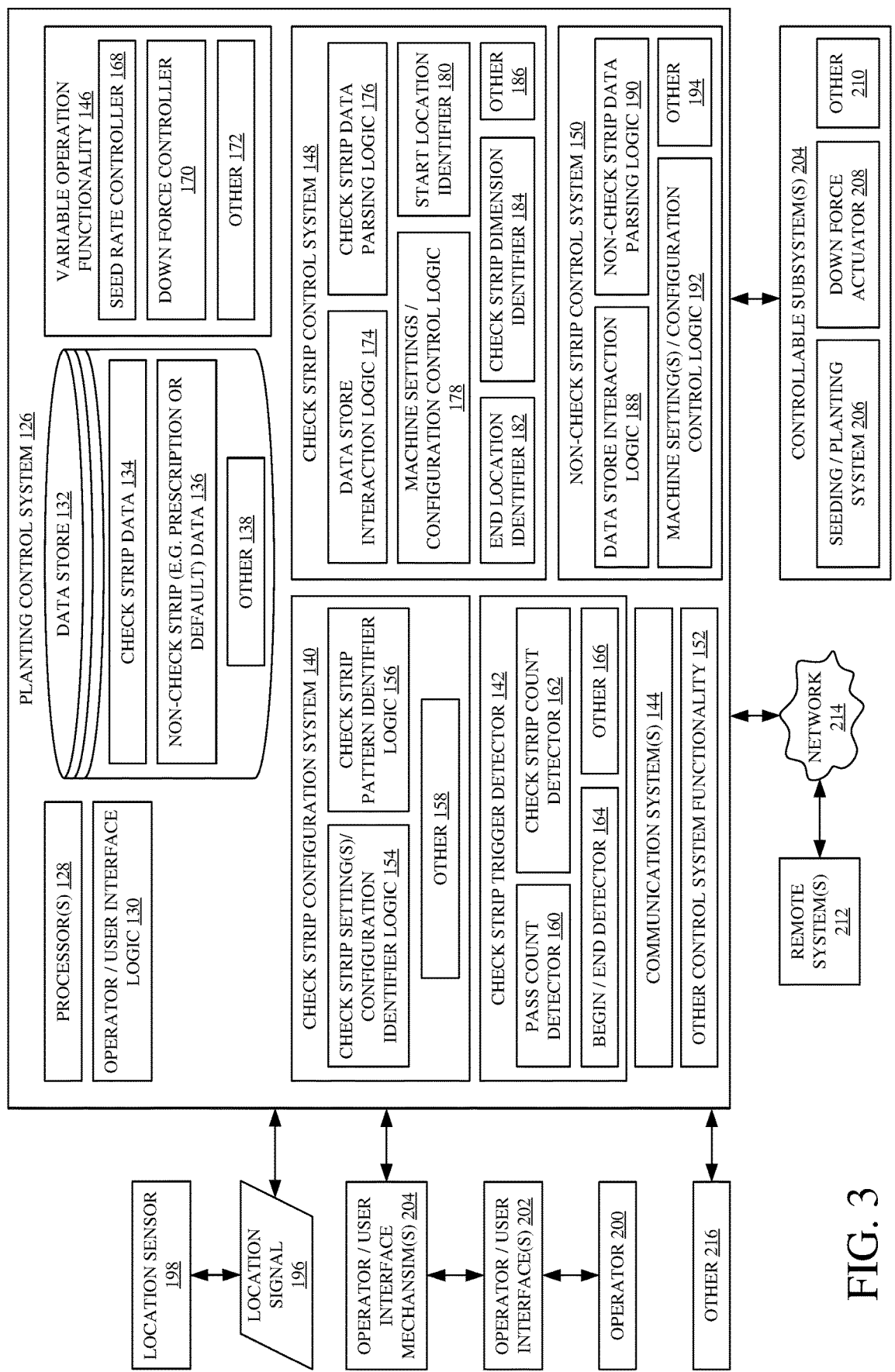
FIG. 3 is a block diagram showing one example of a planting control system in more detail.

FIG. 3 is a block diagram of one example of a planting control system 126 that can be deployed on planting machine 100. In one example, planting control system 126 can be used on planting machine 100 in order to control the planting of check strips (such as the check strips shown in FIGS. 1 and 2). FIG. 3 shows that, planting control system 126 can receive a location signal 196 from a location sensor 198. Location sensor 198 can be, for example, a GPS receiver, or another location sensor that senses the location of machine 100.

FIG. 3 also shows that planting control system 126 can receive inputs from an operator 200 through operator/user interfaces 202, or through other operator/user interface mechanisms 204. The operator/user interface mechanisms can be a wide variety of different types of mechanisms, such as a steering wheel, levers, linkages, pedals, touch sensitive display screens, microphones (where speech recognition is provided), or other audio, visual or haptic mechanisms. Mechanism 204 can also include such things as links, icons, or other operator-actuatable input mechanisms that can be displayed on a display screen. They can be actuated using a point and click device, using touch gestures, etc.

FIG. 3 also shows that planting control system 126 can generate control signals to control one or more different controllable subsystems 203. The controllable subsystems can include such things as the seeding/planting system 206 on planter 100, a downforce actuator 208 that applies downforce on one or more row units on planter 100, or a wide variety of other items 210. Further, FIG. 3 shows that planting control system 126 can communicate with various remote systems 212 over a network 214. The remote systems can include a farm manager's computing system, a vendor computing system, a computing system for maintenance personnel, or a wide variety of other remote systems 212. Therefore, network 214 can be a wide area network, a local area network, a near field communication network, a cellular communication network, or any of a wide variety of other networks or combinations of networks.

FIG. 3 also shows that planting control system 126 can receive inputs from, and generate outputs to, a wide variety of other items 216. Before describing the overall operation of planting control system 126 in controlling planting machine 100 to plant check strips, some of the items in planting control system 126, and their operation, will first be provided.

In the example shown in FIG. 3, planting control system 126 illustratively includes one or more processors 128, operator/user interface logic 130, data store 132 (that can include check strip data 134, non-check strip (e.g., prescription or default) data 136, and other items 138), check strip configuration system 140, check strip trigger detector 142, communication system 144, variable operation functionality 146, check strip control system 148, non-check strip control system 150, and it can include a wide variety of other control system functionality 152. In the example illustrated, check strip configuration system 140 illustratively includes check strip settings/configuration identifier logic 154, check strip pattern identifier logic 156, and it can include other items 158. Check strip trigger detector 142 illustratively includes pass count detector 160, check strip count detector 162, begin/end detector 164, and it can include other items 166. Variable operation functionality 146 illustratively includes seed rate controller 168, downforce controller 170, and other items 172. Check strip control system 148 illustratively includes data store interaction logic 174, check strip data parsing logic 176, machine settings/configuration control logic 178, start location identifier 180, end location identifier 182, check strip dimension identifier 184, and it can include other items 186. Non-check strip control system 150 illustratively includes data store interaction logic 188, non-check strip data parsing logic 190, machine setting/configuration control logic 192, and it can include other items 194.

Operator/user interface logic 130 illustratively generates operator interfaces and detects user interactions with operator/user interface mechanisms 204. It can generate a signal indicative of those interactions and provide it to other items in planting control system 126.

Data store 132 illustratively holds check strip data 134 which defines the operation of planting machine 100, when it is operating in a check strip. By way of example, if the check strip is being used to change the planting rate, then check strip data 134 will indicate this.

Non-check strip (e.g., prescription or default) data 136 defines the operation of machine 100 when it is not in a check strip. Thus, it may define the prescription planting rate, or other machine configuration or settings information that is to be used when machine 100 is not operating in a check strip.

Check strip configuration system 140 illustratively allows operator 200, or another user, to configure the check strip. Check strip setting/configuration identifier logic 154 illustratively detects operator inputs or other inputs that indicate the machine configuration or settings that are to be used during operation in a check strip. This can include such information as planting rate information to be used in the check strip, the downforce to be used in the check strip, or any other machine operation information or settings that are to be used in a check strip.

Check strip pattern identifier logic 156 may allow a user to identify a check strip pattern. For instance, it may be that the user provides an input indicating that a check strip is to be planted on every third pass through the agricultural field. Similarly, it may be that the user provides an input indicating that a certain percentage of a field or a certain number of acres, are planted as check strips, or that a certain number of check strips are to be planted on a given pass. All of this information, provided by check strip configuration system 140, can be stored as check strip data 134 in data store 132.

It will be noted that check strip configuration system 140, in planting control system 126, does not predefine a location of a check strip in the field. Instead, it simply indicates a check strip pattern (such as every third pass, or three check strips on every third pass, etc.). It also identifies the planting operation change that is to take place in the check strip (such as the change in planting rate, downforce, etc.).

Check strip trigger detector 142 detects when to begin check strip operation. For instance, if the check strip pattern identifier logic 156 has identified a user input (or other input) indicating that a check strip is to be planted every third pass, then pass count detector 160 detects a count of the number of passes. It accesses the check strip data 134 to determine when a pass should be planted as a check strip. It generates a trigger signal indicating this. For instance, it can use location sensor 198 to determine when planting machine 100 turns around to begin another pass. It can count passes in other ways as well. When a pass is about to begin, that is to be planted as a check strip, detector 160 indicates this to begin/end detector 164 which generates a signal to begin a check strip. Similarly, check strip count detector 162 can count a number of check strips that have been planted, to determine whether additional check strips are to be planted. By way of example, it may be that the check strip pattern indicted in check strip data 134 indicates that a check strip is to be planted every 300 yards of operation, on every third pass. Then it can determine whether a sufficient number of check strips have been planted or whether sufficient distance has been traveled to begin another check strip. Begin/end detector 164 generates a signal indicating when a check strip is to begin and when it is to end. The check strip data 134 may also indicate how long a check strip should be (e.g., an entire pass, x number of yards, etc.). Of course, an indication to begin check strip operation can be generated in other ways as well, by other logic 166.

Variable operation functionality 146 includes functionality on planting machine 100 that can be controlled to change when operating in a check strip. For instance, seed rate controller 168 can be used to control (e.g., change) the seeding rate in a check strip from that used in the remainder of the field. Downforce controller 170 can be used to change the downforce on row units on planting machine 100 in a check strip, from that applied in other areas.

Check strip control system 148 receives an input from check strip trigger detector 142 indicating when a check strip is to begin and when a check strip is to end. It then controls machine 100 so that it performs a check strip operation when it is operating in a check strip. Again, as discussed above, check strip trigger detector 142 generates a signal when a check strip is to begin based upon the check strip configuration data, and it can generate a signal indicating that a check strip should end based upon check strip dimension data that indicates how long a check strip should be, within a field.

When a trigger signal is received from check strip trigger detector 142 indicating that a check strip is to begin, then data store interaction logic 174 interacts with data store 132 to obtain check strip data 134. Check strip data parsing logic 176 parses the data 134 to identify what changes are to be made in the planting operation, in the check strip. Machine settings/configuration control logic 178 generates control signals to control the various machine settings or configuration, or other controllable subsystems so that they begin performing check strip operation. When that happens, start location identifier 180 accesses the location signal 196, and it also accesses machine dimension information which identifies an offset between location sensor 198 and the actual plant mechanisms. It uses this information to identify a specific location in the field as to where the check strip operation actually began.

When a check strip has been planted, and a trigger signal is received from check strip trigger detector 142 indicating that the check strip operation should end, then non-check strip control system 150 controls machine 100 to return to the non-check strip (e.g., default or prescribed) operation. For instance, it reconfigures the machine, or resets the machine settings so that the prescribed, default, or other non-check strip operation resumes. In doing so, data store interaction logic 188 obtains non-check strip data 136 from data store 132. Non-check strip data parsing logic 190 parses that data to identify the machine settings or machine configuration that is to be used when machine 100 is planting in a non-check strip area. Machine setting/configuration control logic 192 generates control signals to control the variable machine operation functionality 146 and/or controllable subsystems 203 to begin performing according to the prescription, default, or other non-check strip operation.

When this occurs, end location identifier 184 in check strip control system 148 accesses the location signal 196 that identifies the position of location sensor 198 when the non-check strip operation commenced (after the check strip was planted). It also accesses machine dimension information to identify the particular location in the field where the non-check strip operation commenced (e.g., where the check strip ended). Check strip dimension identifier 186 then uses the location where the check strip began, the location where the check strip ended, and the machine dimension information, to identify the location and dimension of the check strip which was just planted.

For instance, again referring to FIG. 1, check strip trigger detector 142 generates a check strip start signal at the beginning 220 of pass 108 because the check strip is to be planted every third pass (as indicated by the check strip data 134). At that point, data store interaction logic 174 obtains check strip data 134, and that data is parsed by check strip data parsing logic 176. Machine setting/configuration control logic 192 controls the machine settings or configuration (e.g., the variable operation functionality 146 and/or controllable subsystems 203) to begin the check strip operation. When this occurs, start location identifier 180 identifies the location 220 where the check strip started. When the check strip is over, end location identifier 182 identifies the end location 222 when the check strip ends. Based upon the start and end location and the width of machine 100, check strip dimension identifier 184 identifies the overall dimension of the check strip which now comprises pass 108 in FIG. 1. When the pass is completed (e.g., when machine 100 begins a turn), then non-check strip control system 150 resumes controlling machine 100 so that pass 110 is planted using non-check strip operation.

Figure 4A:
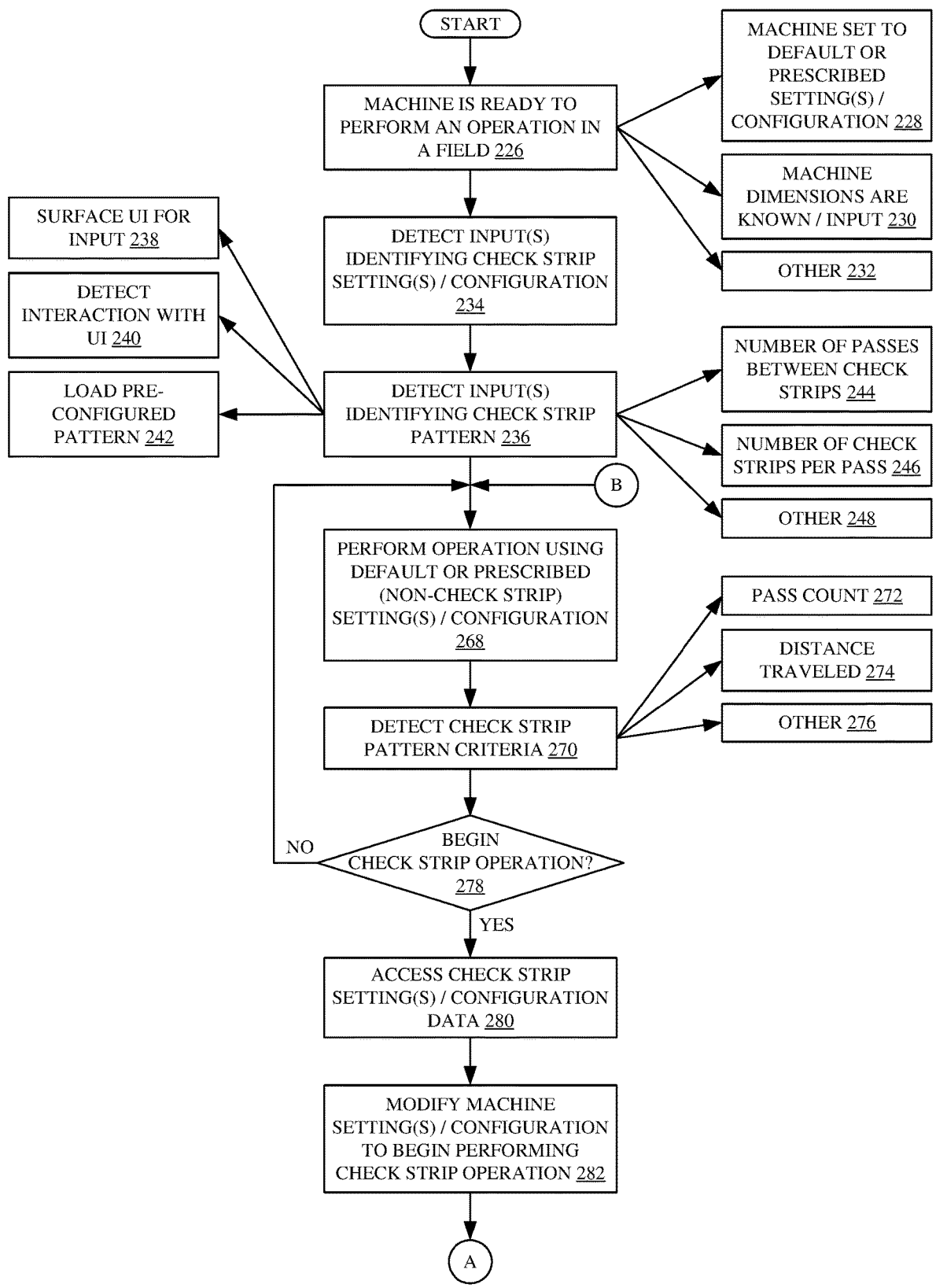
FIGS. 4A and 4B (collectively referred to herein as FIG. 4) illustrate a flow diagram showing one example of the operation of the planting control system illustrated in FIG. 3.
Figure 4B:
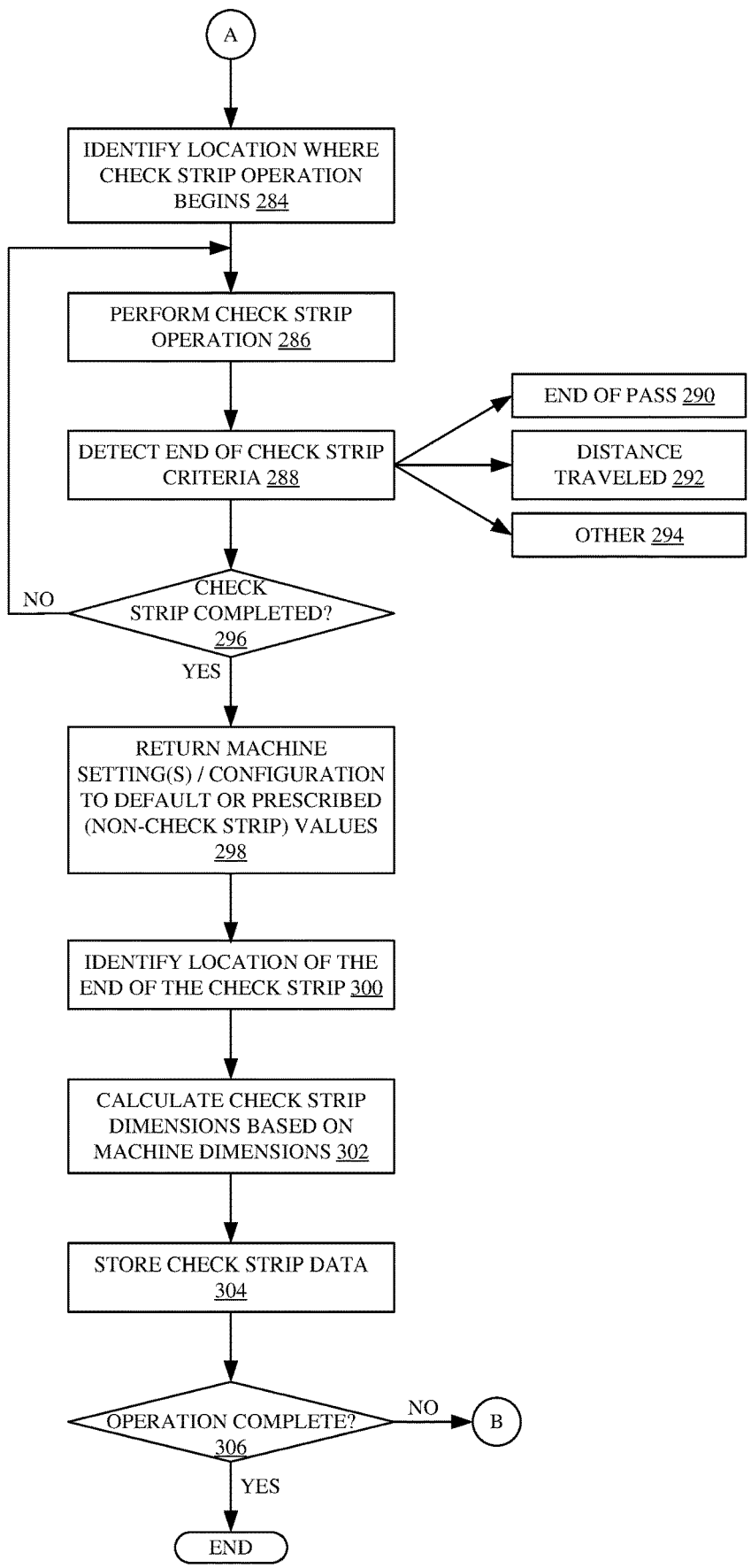

FIGS. 4A and 4B (collectively referred to herein as FIG. 4) illustrate a flow diagram showing one example of the operation of planting control system 126 in planting check strips in field 102.

It is first assumed that machine 100 is ready to perform an operation in a field. For purposes of the present discussion, it will be assumed that the operation is a planting operation. This is indicated by block 226 in the flow diagram of FIG. 4. The machine 100 is illustratively set to have a default or prescribed configuration and settings values so that it will begin operating in a non-check strip manner in field 102. This is indicated by block 228. It is also assumed that machine dimensions are known or input into planting control system 126. These can be pre-programmed into system 126 or provided by operator 200 through operator interface mechanisms 204 or in other ways. Receiving the machine dimensions is indicated by block 230. The machine can be ready for operation in the field 102 in other ways as well, and this is indicted by block 232.

At some point, check strip configuration system 140 will receive an input identifying the check strip settings and/or machine configuration. This will define how the machine will operate when in a check strip. Detecting these inputs is indicated by block 234 in the flow diagram of FIG. 4.

Check strip pattern identifier logic 156 may also receive one or more inputs identifying a check strip pattern. This is indicated by block 236. For instance, logic 156 can use operator/user interface logic 130 to surface a user interface for user input of this information. This is indicated by block 238. Logic 130 can also detect user interaction with the user interface as indicated by block 240. In another example, logic 156 can detect pre-loaded configuration information which is already loaded into system 126 as part of check strip data 134. This is indicated by block 242.

The check strip pattern information can identify a number of passes between check strips (e.g., that a check strip is to be planted every third pass, etc.). This is indicated by block 244. It can also identify a number of check strips per pass. For instance, if check strips are to be planted every third pass in field 102, then the check strip information may further define that two different check strips are to be planted in that pass. Receiving a number of check strips per pass is indicated by block 246 in the flow diagram of FIG. 4. The check strip pattern information can be identified in other ways as well, and this is indicated by block 248.

Figures 5A, 5B:
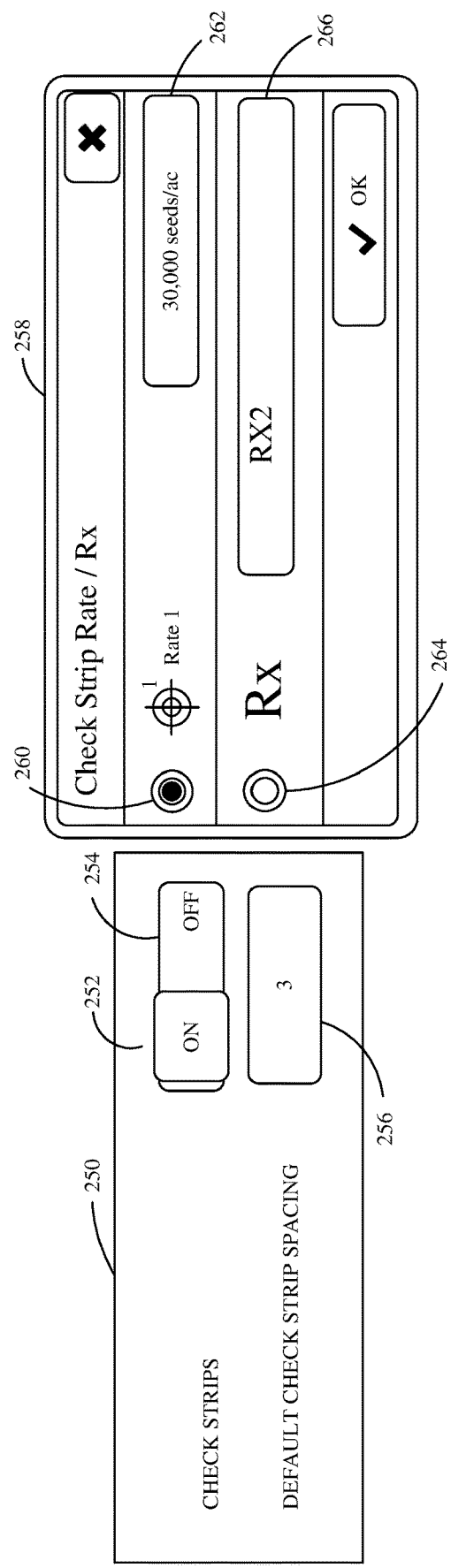
FIGS. 5A and 5B are examples of user interface displays that can be used to configure check strip operation.

FIG. 5A shows an example of a user interface display 250 that has a plurality of different user input mechanisms 252, 254, and 256. User interface display 250 may be displayed to the operator 200 in the operator compartment of planting machine 100. Actuators 252 and 254 allow the operator to determine whether check strips are to be planted during the planting operation. User input mechanism 256 allows the operator to provide an interval spacing between check strips. In the example shown in FIG. 5A, the number shown in user input mechanism 256 is the number of passes in which a check strip is planted. Thus, as shown in FIG. 5A, planting control system 126 will control machine 100 to plant a check strip on every third pass through field 102.

FIG. 5B is another example of a user interface display 258 that can be displayed for operator interaction. The user input mechanisms include a selector 260 that allows the user to select, for definition, the check strip operation or the prescribed operation. FIG. 5B shows that the check strip operation has been actuated. Thus, in the example shown in FIG. 5B, the control change that is being performed in the check strip is seed rate. Actuator 262 allows the operator to input a seed rate that is to be used in the check strips. When actuator 264 is selected, it allows the user to select a prescribed or default seed rate using input mechanism 266. It can be seen that the user has selected, as the default or prescribed seed rate, a rate entitled "RX2".

Once these inputs are received then and machine 100 is configured and set so it can be used to perform the non-check strip (e.g., default or prescribed) operation Machine 100 then begins performing the non-check strip planting operation. This is indicated by block 268 in the flow diagram of FIG. 4. Check strip trigger detector 142 continues to detect the check strip pattern criteria indicating when a check strip should begin. This is indicated by block 270. For instance, pass count detector 160 can detect pass count 272. Check strip count detector 162 can detect the distance that has been traveled since the last check strip, to determine whether another check strip should be planted. This is indicated by block 274. The check strip pattern criteria can be detected in a wide variety of other ways as well, and this is indicated by block 276.

Until a check strip operation is to begin (as indicated by the check strip pattern criteria), machine 100 continues to perform in a non-check strip way (such as using the default or prescribed planting operation). This is indicated by block 278. However, when a check strip is to be planted, check strip trigger detector 142 generates a trigger signal indicating this. This causes check strip control system 148 to begin controlling machine 100 so that it can plant a check strip. Thus, data store interaction logic 174 accesses data store 132 to obtain the check strip data 134. This data identifies the machine settings or configuration that is to be used when planting a check strip. Accessing the data store to obtain this data is indicated by block 280 in the flow diagram of FIG. 4.

Check strip data parsing logic 176 parses the data to identify the machine settings and/or configuration information needed to modify the control of machine 100 for check strip operation. Machine setting/configuration control logic 178 then generates control signals to do that. Modifying machine settings and/or configuration to begin performing the check strip operation is indicated by block 282.

When the check strip operation actually begins, start location identifier 180 identifies the location in field 102 where the check strip operation begins. As discussed above, this can be based on the location signal 196 and any dimensional information which identifies the offset between location sensor 198 and the row units or other planting mechanisms that are actually planting in field 102. Identifying the location where the check strip operation begins is indicated by block 284 in the flow diagram of FIG. 4.

Check strip control system 148 then controls variable operation functionality 146 and/or controllable subsystems 203 to perform the check strip operation in field 102. This is indicated by block 286.

Check strip trigger detector 142 detects the check strip trigger criteria to determine whether the check strip should end. This is indicated by block 288. This can be the end of a pass 290, the distance traveled (assuming that the check strip distance has been specified) 292, or a wide variety of other check strip criteria 294. When check strip trigger detector 142 detects that the check strip should end, begin/end detector 164 generates a trigger signal. Until then, the check strip operation continues, as indicated by block 296.

Once the check strip end signal is generated, then non-check strip control system 150 begins controlling machine 100 to perform the non-check strip operations (such as the prescribed or default operations). This is indicated by block 298. At that point, end location identifier 182 identifies the location of the end of the check strip. This is indicated by block 300. Check strip dimension identifier 184 then calculates the check strip dimensions based upon the start location, the end location and the machine dimensions (e.g., the machine width). This is indicated by block 302. It then stores the check strip data (its location and dimensions) as check strip data 134. This is indicated by block 304.

If the overall agricultural operation in field 102 is not complete, as indicated by block 306, then operation returns to block 268 where machine 100 continues to perform the non-check strip planting operation.

It can thus be seen that using the present system, there is no need for the machine to precisely hit a pre-defined check strip location. Instead, the machine simply notes the location where the check strip starts, and where it ends, and calculates the check strip dimension based upon those two points and the machine dimension. It can thus be ensured that the planting operation was performed using the check strip configuration and settings, in the check strip. This is because the check strip location was not pre-defined, but its location was defined based on where the check strip was actually planted. This greatly improves the accuracy and efficacy of any information generated based upon the check strip.

Figure 6:
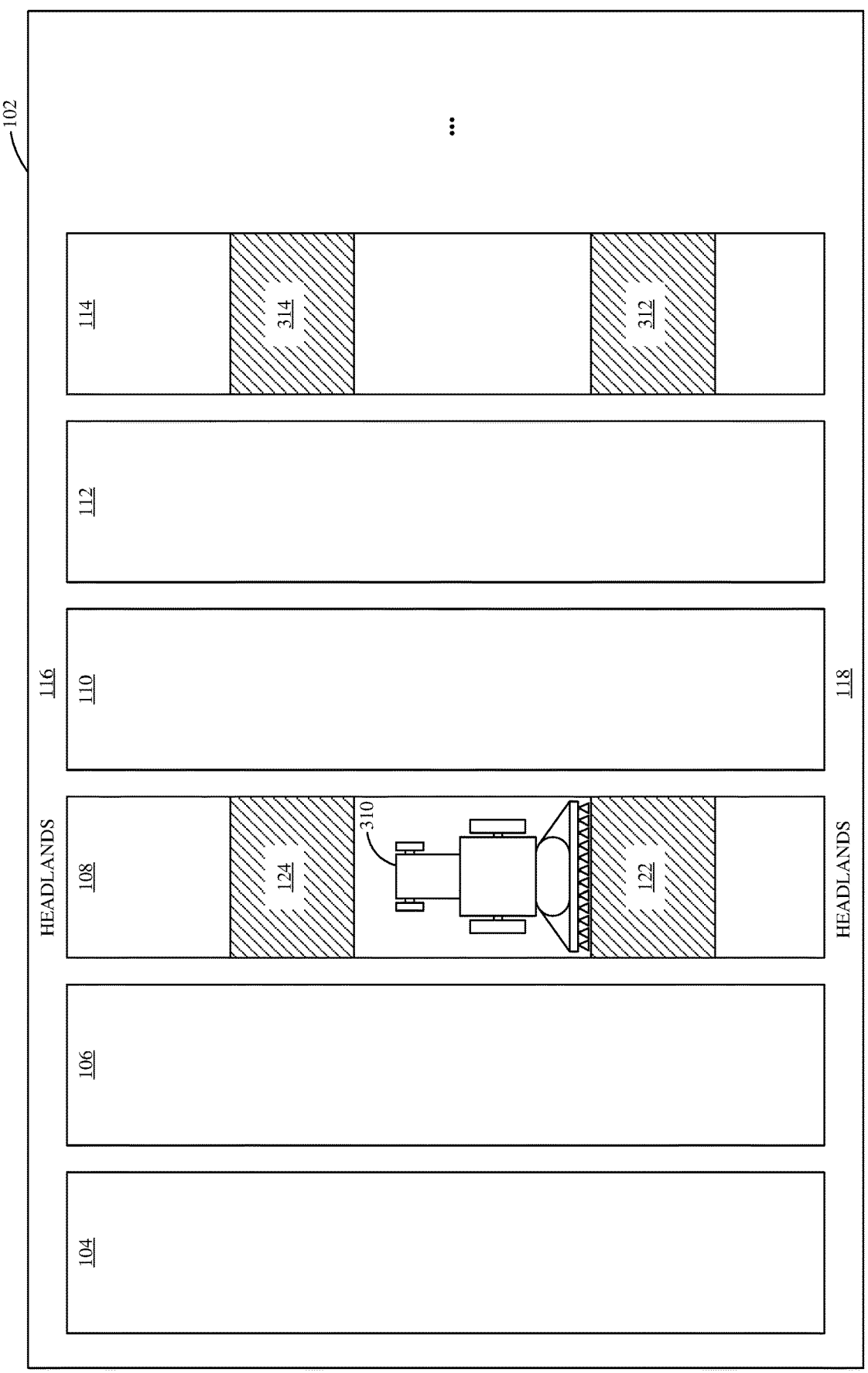
FIG. 6 is a pictorial illustration showing an agricultural machine performing a post-planting operation.

FIG. 6 is a pictorial illustration that is similar to that shown in FIG. 2, and similar items are similarly, numbered. However, FIG. 6 shows that a different agricultural machine (e.g., a sprayer) 310 is performing a post-planting operation in field 102. Also, it is assumed that, in field 102, two check strips were planted by planting machine 100, on every third pass of the machine 100 through field 102. Thus, check strips 122 and 124 are illustrated in pass 108, and check strips 312 and 314 are illustrated in pass 114. In the example shown, sprayer 310 is illustratively configured to spray a certain chemical on field 102 at a given rate in non-check strip areas, and at a different rate in the check strip areas. This is just one example, and sprayer 310 can be configured to change operation between non-check strip areas and check strip areas in other ways as well.

Figure 7:
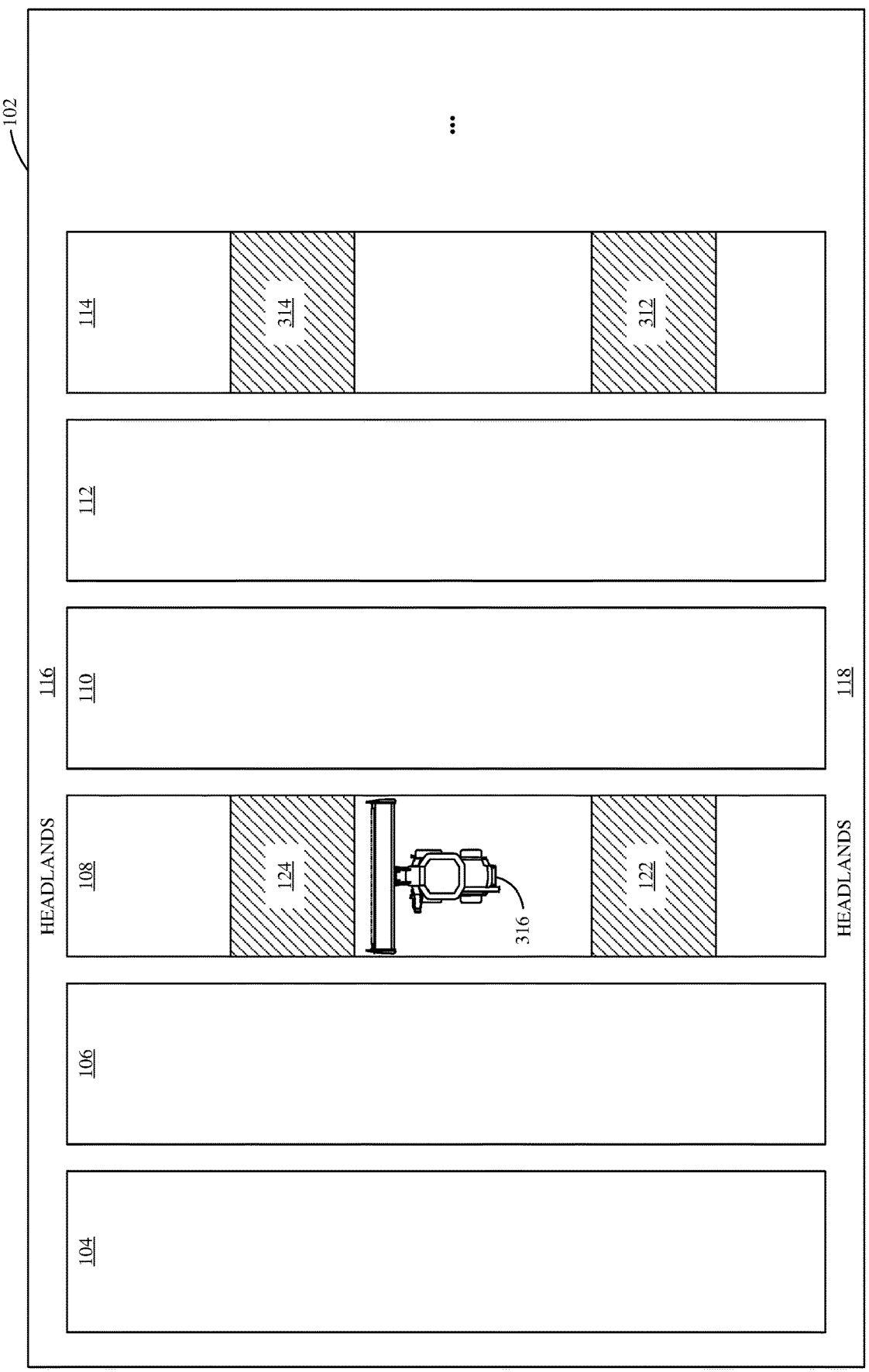
FIG. 7 is a pictorial illustration showing an example of an agricultural machine performing a harvesting operation.

FIG. 7 is similar to FIG. 6, and similar items are similarly numbered. However, FIG. 7 shows yet another agricultural machine 316 (such as a harvester) performing another post-planting operation (e.g., a harvesting operation).

Figure 8:
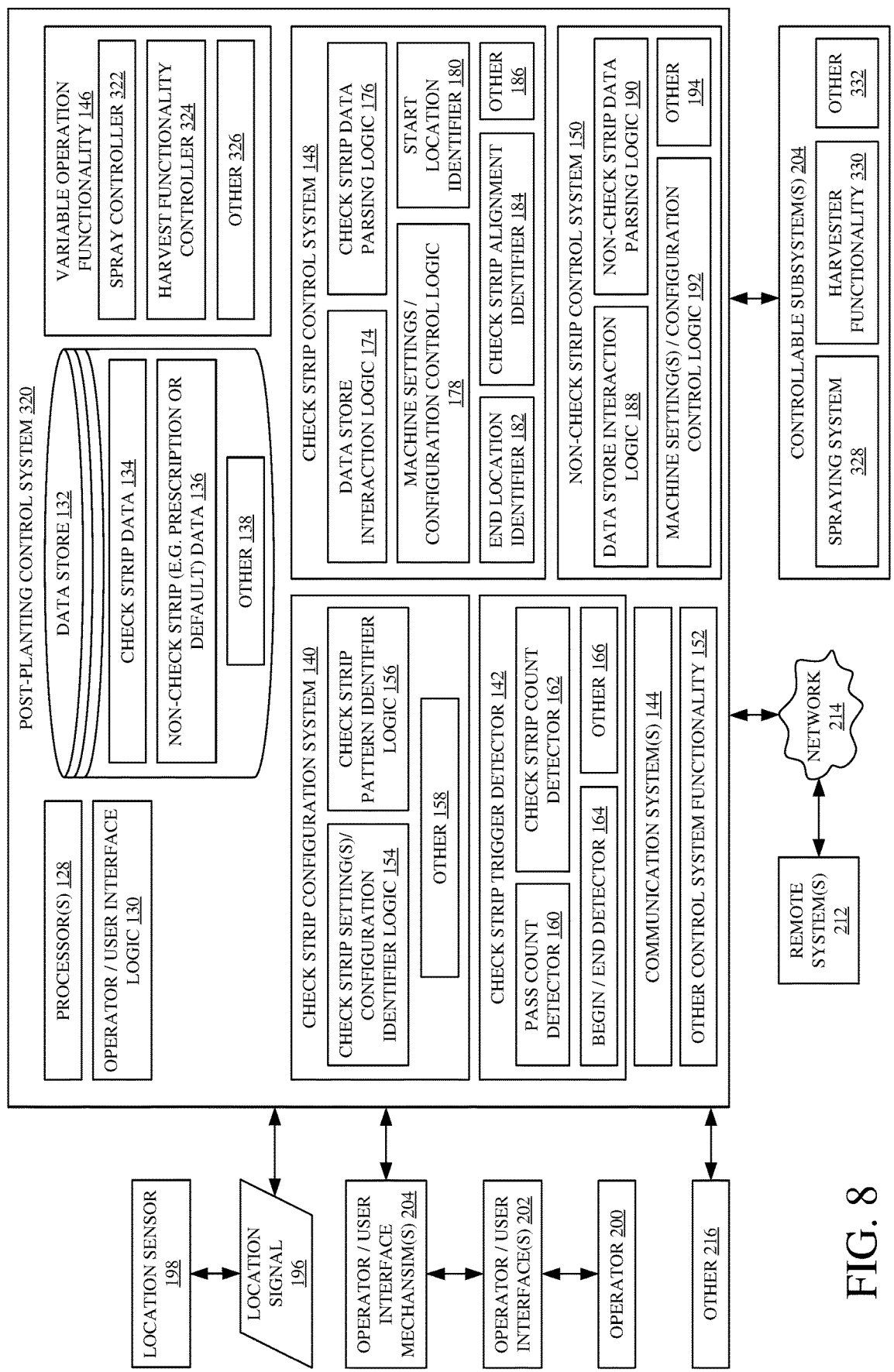
FIG. 8 is a block diagram showing one example of a post-planting control system, in more detail.

FIG. 8 shows a block diagram of one example of a post-planting control system 320 that can be used on either of the agricultural machines 310 or 316 (or others) that are performing post-planting operations. It is similar to the planting control system 126 shown in FIG. 3, and similar items are similarly numbered. However, instead of the variable operation functionality 146 being seed rate controller 168 and downforce controller 170, it now includes functionality on the post-planting machines (or the machines performing a post-planting operation). Thus, it can include spray controller 322, harvest functionality controller 324, and it can include other items 326. Also, check strip control system 148 includes check strip alignment identifier 370 that helps determine whether the post-planting machine is aligned with a check strip. Similarly, the controllable subsystems 203 now include spraying system 328, harvester functionality 330, and/or a wide variety of other items 332. Therefore, during operation, check strip controller system 148 provides signals to variable operation functionality 146 so that spray controller 322 can control the spraying system 328 in check strips 122, 124, 312 and 314. Non-check strip control system 150 generates control signals so that spray controller 322 can control spraying system 328 in the non-check strip areas of field 102. Similarly, check strip control system 148 generates signals so that harvest functionality controller 324 can control harvest functionality 330 in check strip areas 122, 124, 312 and 314, and non-check strip control system 150 generates signals so that harvest functionality controller 324 can control harvest functionality 330 in non-check strip areas. The particular spray functionality and harvester functionality that is controlled may vary widely, depending upon the type of change that the operator wishes to have in the check strips, relative to the non-check strip areas.

Figure 9A:
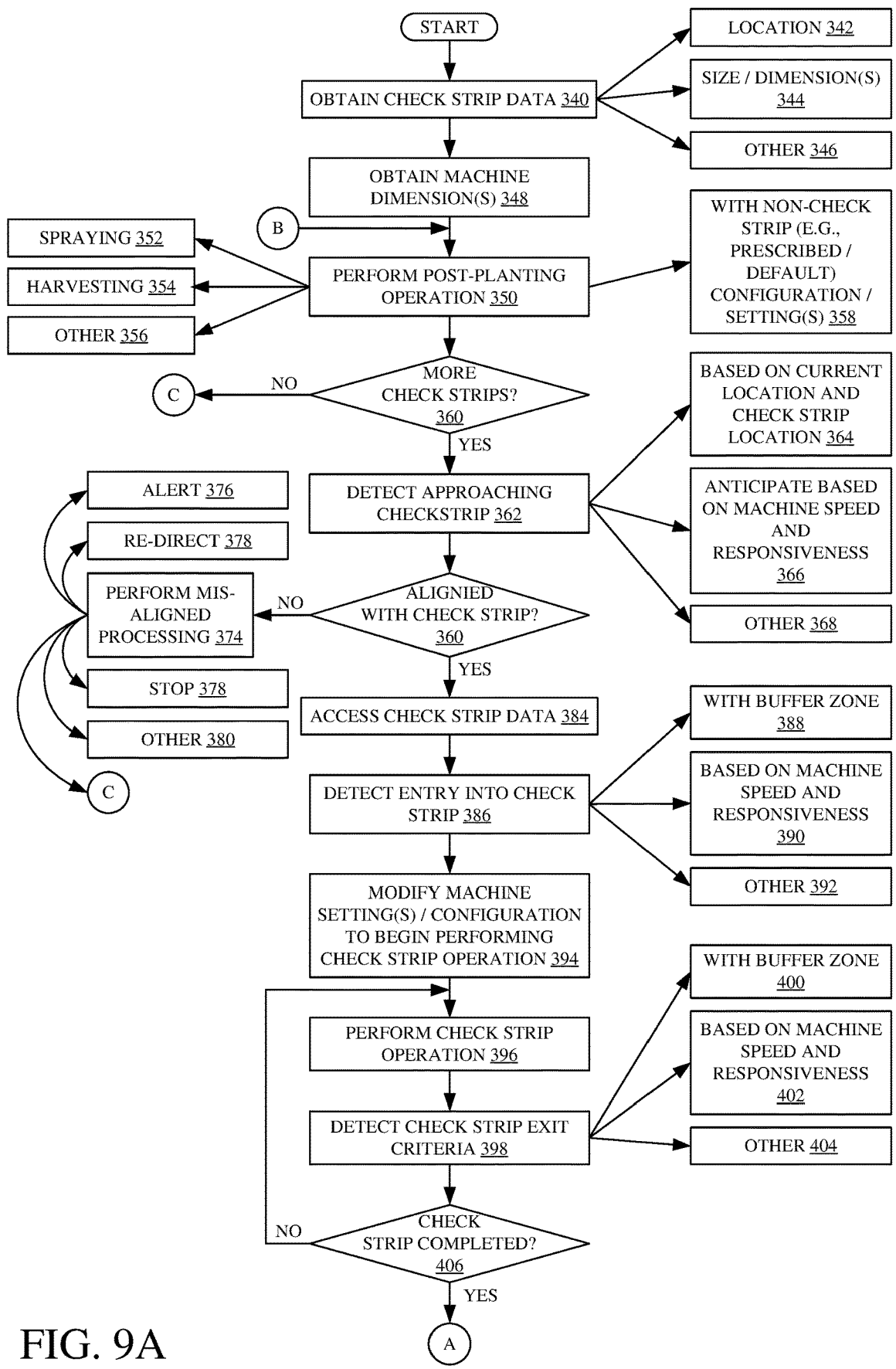
FIGS. 9A and 9B (collectively referred to herein as FIG. 9) illustrate a flow diagram showing one example of the operation of the post-planting control system shown in FIG. 8.
Figure 9B:
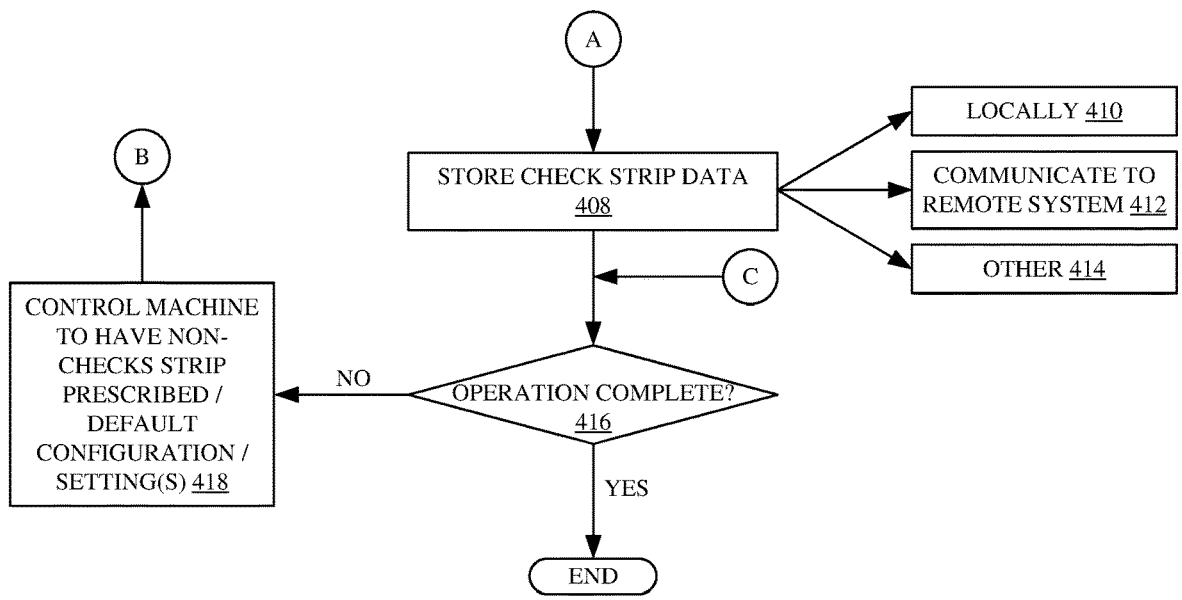

FIGS. 9A and 9B (collectively referred to herein as FIG. 9) illustrate a flow diagram showing one example of the operation of post-planting control system 320, shown in FIG. 8) in controlling the post-planting operation of machines 310 and/or 316, relative to the check strips in field 102. It is first assumed that the post-planting control system 320 receives the check strip data, as indicated by block 340. This can include the location of the check strip as indicated by block 342, the size or dimensions of the check strip as indicated by block 344, and it can include other information 346. This can be received from operator 200, from a remote system 212, or in other ways. Post-planting control system 320 also obtains the machine dimensions of the machine performing the post-planting operation. This is indicated by block 348 in FIG. 9. This information can be input by operator 200. It can be pre-programmed into system 320, or it can be received in other ways.

Non-check strip control system 150 then controls the machine to perform the post-planting operation in a non-check strip area. This is indicated by block 350. It can be a spraying operation 352, a harvesting operation 354, or another operation 356. The machine can be set so that it performs the operation in the prescribed or default way, or using other non-check strip configuration and settings. This is indicated by block 358. If the machine has not treated all of the check strips, as indicated by block 360, then check strip trigger detector 142 continues to detect the check strip criteria to determine whether the machine is approaching a check strip. This is indicated by block 362. This can be based on the current location, orientation and speed (or path) of the machine and the check strip location, as indicated block 364. It can be anticipated based upon the machine speed and the responsiveness of the items on the machine that are controlled for the check strip operation. This is indicated by block 366. For instance, if the machine is traveling quickly and the spray nozzles are not highly responsive, then the sprayer 310 will begin reconfiguring itself for check strip operation a greater distance before it reaches the check strip than if it is traveling more slowly or if the machine is more responsive. This is just one example. Detecting whether the machine is approaching a check strip can be done in a wide variety of other ways as well, and this is indicated by block 368.

If it is determined that a check strip is approaching, then check strip alignment identifier 370 (in check strip control system 148) determines whether the machine is aligned with the check strip. For instance, it may be that harvester 316 has a header which is overlapping the boundaries of check strip 124 (e.g., part of the header is in a non-check strip area in another pass 106). Determining whether the machine is aligned with the check strip is indicated by block 372 in the flow diagram of FIG. 9. If not, then post-planting control system 320 can perform processing corresponding to a scenario in which the machine is misaligned with the check strip. This is indicated by block 374. As one example, it can use operator/user interface logic 130 to generate an alert 376 to operator 200 indicating the misalignment. In another example, it can control a steering system or propulsion system on the machine to redirect the machine so that it becomes fully aligned with the check strip. This is indicated by block 378. In yet another example, post-planting control system 320 can control a propulsion system of the machine to stop the machine until the operator 200 takes further action. This is indicated by block 380. The misaligned processing can be performed in a wide variety of other ways as well, and this is indicated by block 382.

If, however, it is determined at block 372 that the machine is fully aligned with the check strip, then data store interaction logic 174 in check strip control system 148 accesses the check strip data 134 in data store 132. This is indicated by block 384. This will indicate the precise location in the field where the check strip begins, as will be identified by start location identifier 180. This can be compared to a current position of the machine (as indicated by location signal 196) to determine when the machine actually enters into the check strip. This is indicated by block 386. In one example, entry into the check strip is determined by identifying a buffer zone before the location where the check strip begins. This is indicated by block 388. The buffer zone can be based upon the machine speed and responsiveness, as indicted by block 390. Detecting entry into a check strip can be done in other ways as well, and this is indicated by block 392.

Once entry of the machine into the check strip has been detected, then machine setting/configuration control logic 178 illustratively modifies the machine settings and/or configuration to begin performing the check strip operation in the check strip. This is indicated by block 394. For instance, where the machine is a sprayer and the rate at which chemical is applied to the check strip is to be changed, the spraying system 328 can be controlled accordingly. When harvester operation (e.g., harvester speed, header height, other machine settings, etc.) is to be changed, then harvester functionality 330 is controlled accordingly.

The machine then performs the check strip operation, while it is in the check strip. This is indicated by block 396. Check strip trigger detector 142 continues to detect the check strip criteria to determine when the machine is exiting the check strip. This is indicated by block 398. Again, it can identify a buffer zone prior to the end of the check strip as indicated by block 400. It can identify check strip exit based on machine speed and responsiveness as indicated by block 402, or in other ways, as indicated by block 404. Performing the check strip operation continues in this way until the machine has exited the check strip, as indicated by block 406.

Once the machine has exited the check strip, it stores any desired check strip data 134 in data store 132. This is indicated by block 408 in the flow diagram of FIG. 9. By way of example, it can record the amount of chemical applied in the check strip. It can record the yield observed in the check strip, or a wide variety of other information. The check strip data can be stored locally as indicated by block 410. In addition, communication system 144 can communicate the check strip data to a remote system 212 where it can be stored for later analysis. This is indicated by block 412. The check strip data can be stored in other ways as well, and this is indicated by block 414.

If the agricultural operation in field 102 is not yet complete, as indicated by block 416, then machine setting/configuration control logic 192 in non-check strip control system 150 modifies the machine to have its non-check strip (e.g., the prescribed or default) configuration and/or settings. This is indicated by block 418. Processing then reverts to block 350 where the machine continues to perform the post-planting operation using the non-check strip settings and/or configuration.

The present discussion has mentioned processors and servers. In one example, the process and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 10:
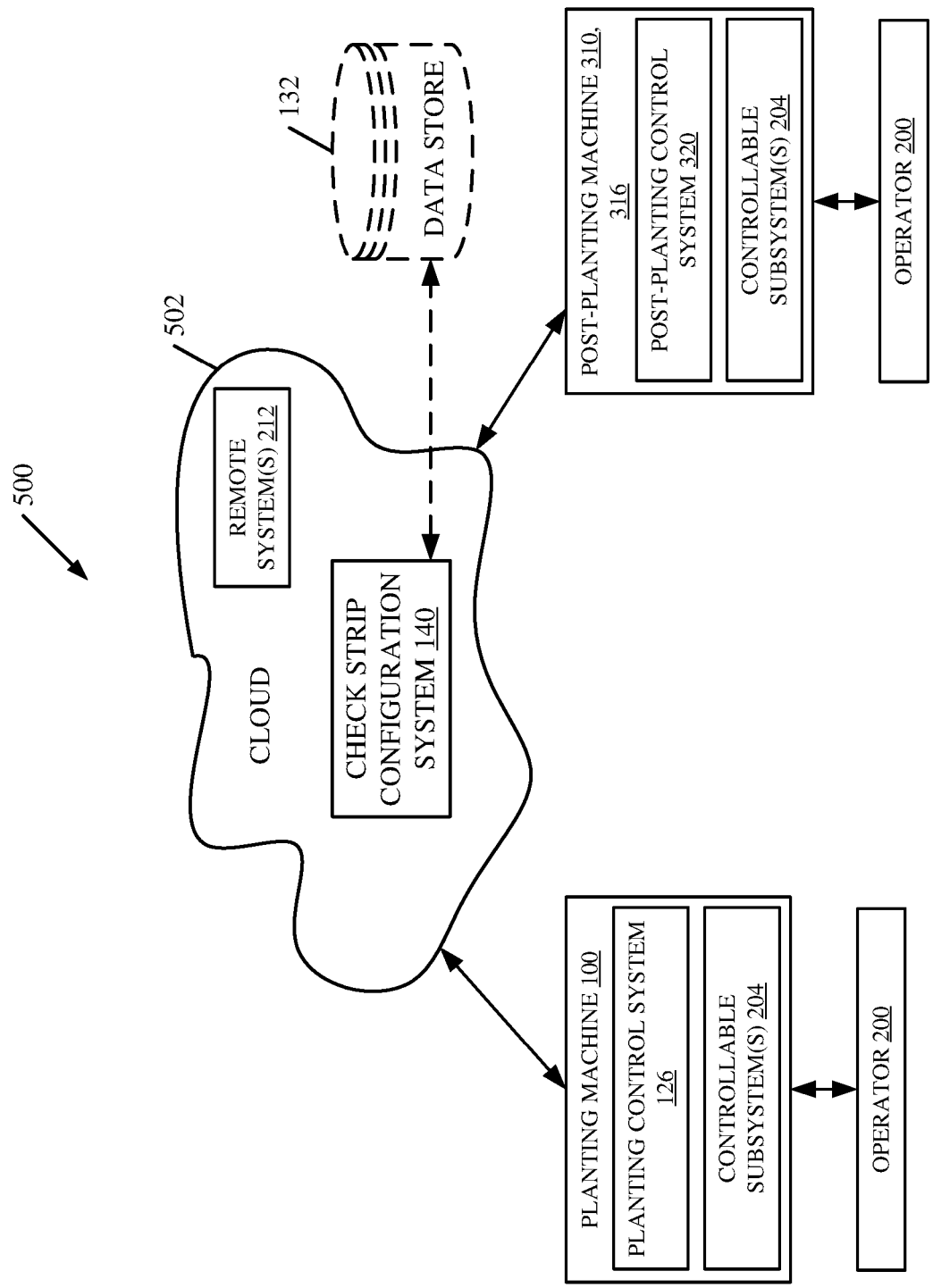
FIG. 10 is a block diagram showing one example of the control systems, illustrated in previous figures, deployed in a remote server architecture.

FIG. 10 is a block diagram of machines 100, 310 and 316 shown in previous Figures, except that they communicate with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIGS. 3 and 8 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 10, some items are similar to those shown in FIGS. 1 and 3 and they are similarly numbered. FIG. 10 specifically shows that some parts of planting control system 126 and post-planting control system 320 and remote system(s) 212 can be located at a remote server location 502. Therefore, machines 100, 310 and 316 access those systems through remote server location 502.

FIG. 10 also depicts another example of a remote server architecture. FIG. 5 shows that it is also contemplated that some elements of FIGS. 3 and 8 can be disposed at remote server location 502 while others are not. By way of example, data store 132 can be disposed at a location separate from location 502, and accessed through the remote server at location 502. Regardless of where they are located, they can be accessed directly by machines 100, 310 and 316, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the machines 100, 310 and 316 come close to the fuel truck for fueling, the system automatically collects the information from the machine 100, 310 and 316 using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the machines 100, 310, 316 until they enter a covered location. The machines, themselves, can then send the information to the main network.

It will also be noted that the elements of FIGS. 3 and 8, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 11:
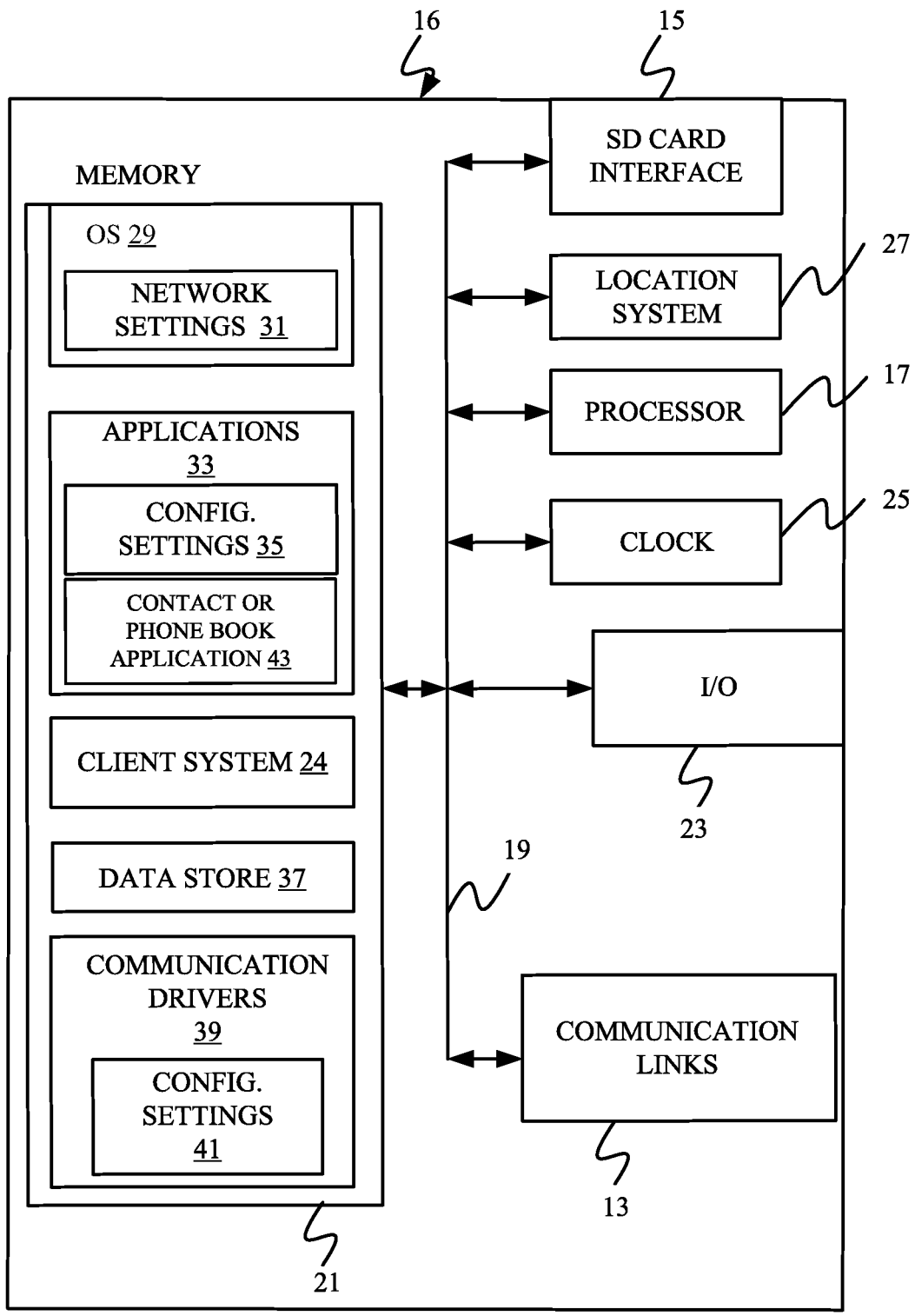
FIGS. 11-13 show examples of mobile devices that can be used in the architectures shown in the previous figures.
Figure 12:
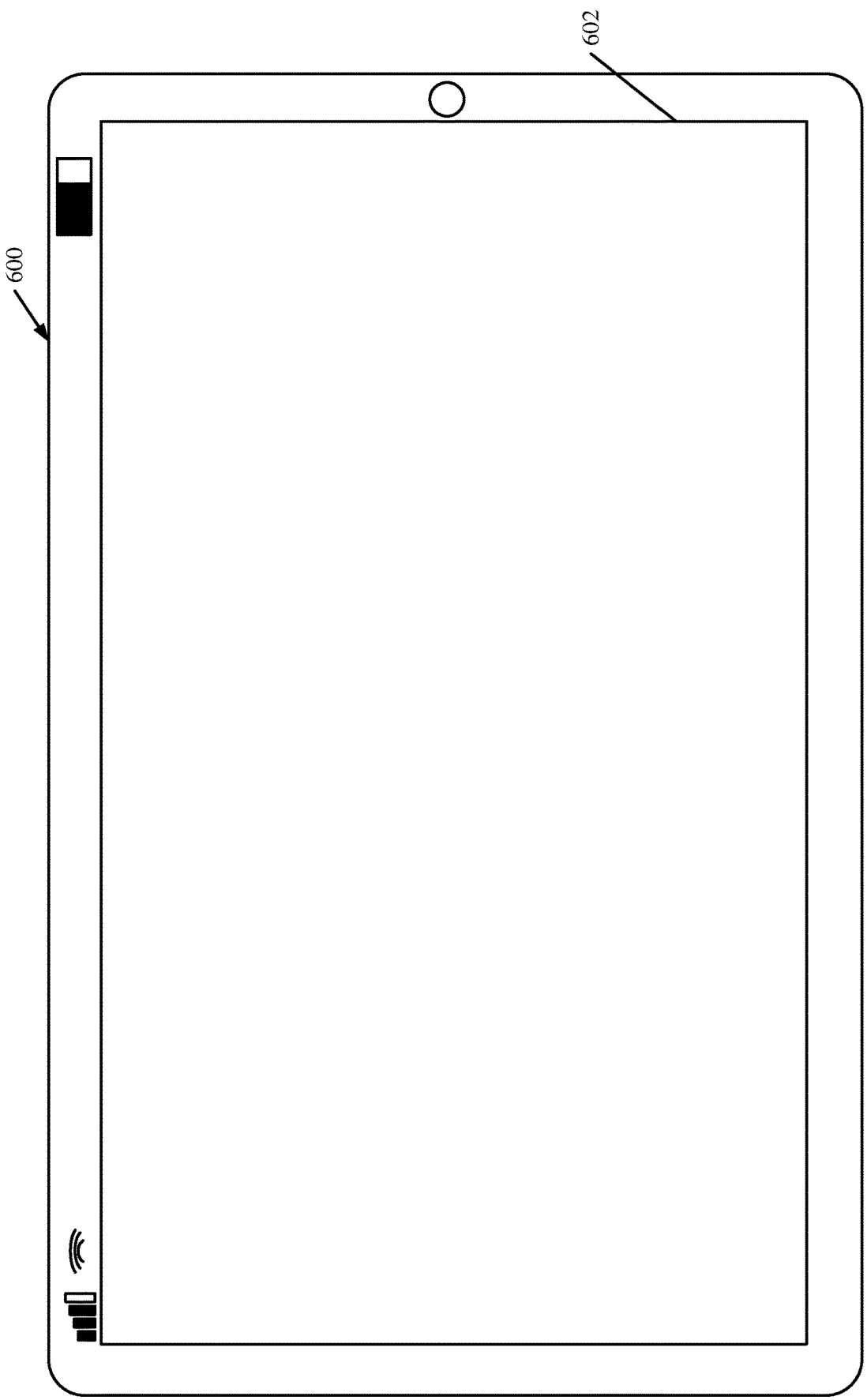
Figure 13:
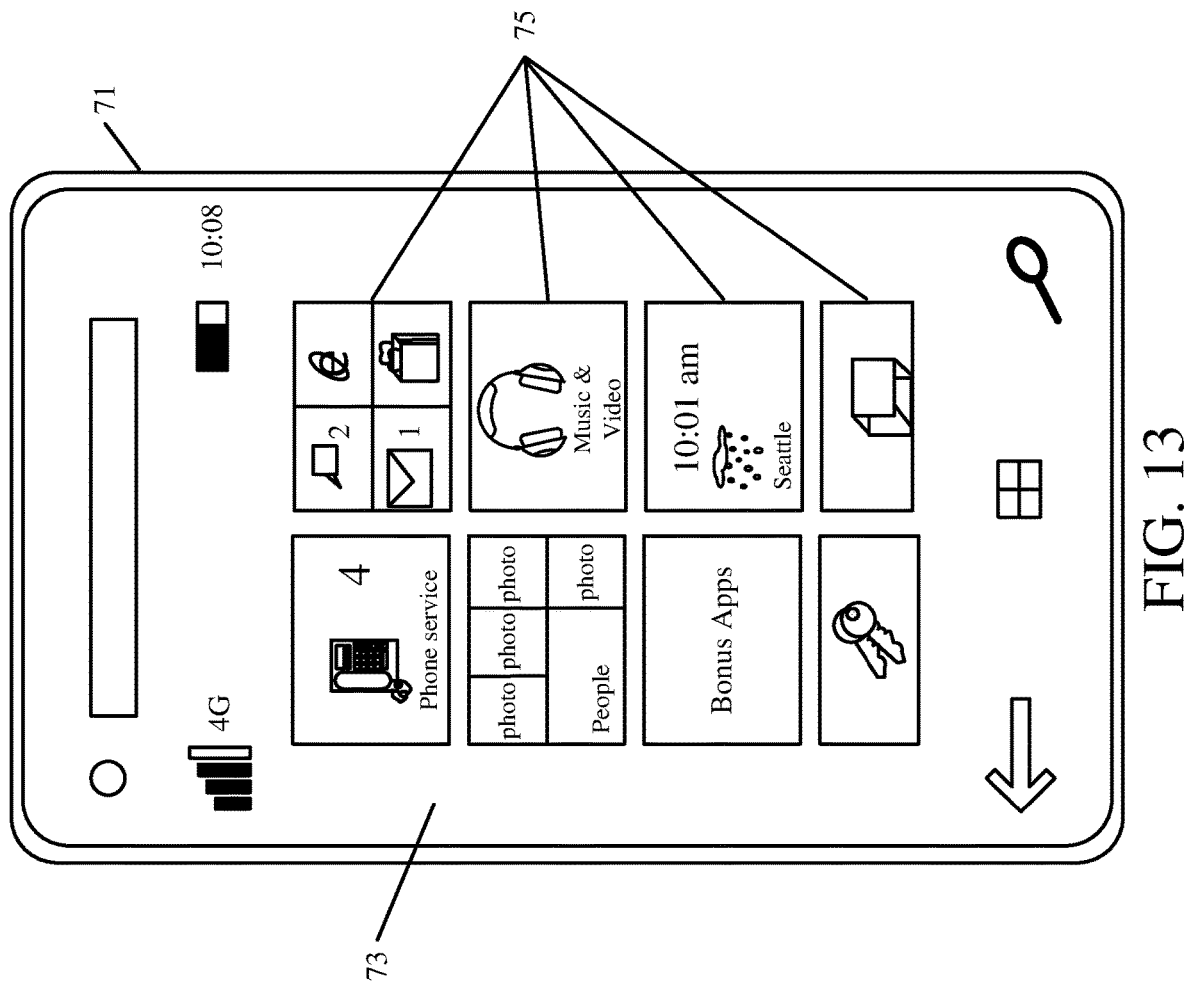

FIG. 11 is a simplified block diagram of one illustrative example of a handheld or mobile computing device that can be used as a user's or client's hand held device 16, in which the present system (or parts of it) can be deployed. For instance, a mobile device can be deployed in the operator compartment of machines 100, 310 and/or 316 for use in generating, processing, or displaying the data. FIGS. 12-13 are examples of handheld or mobile devices.

FIG. 11 provides a general block diagram of the components of a client device 16 that can run some components shown in FIGS. 3 and/or 8, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors from previous Figures) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 12 shows one example in which device 16 is a tablet computer 600. In FIG. 12, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 13 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 14:
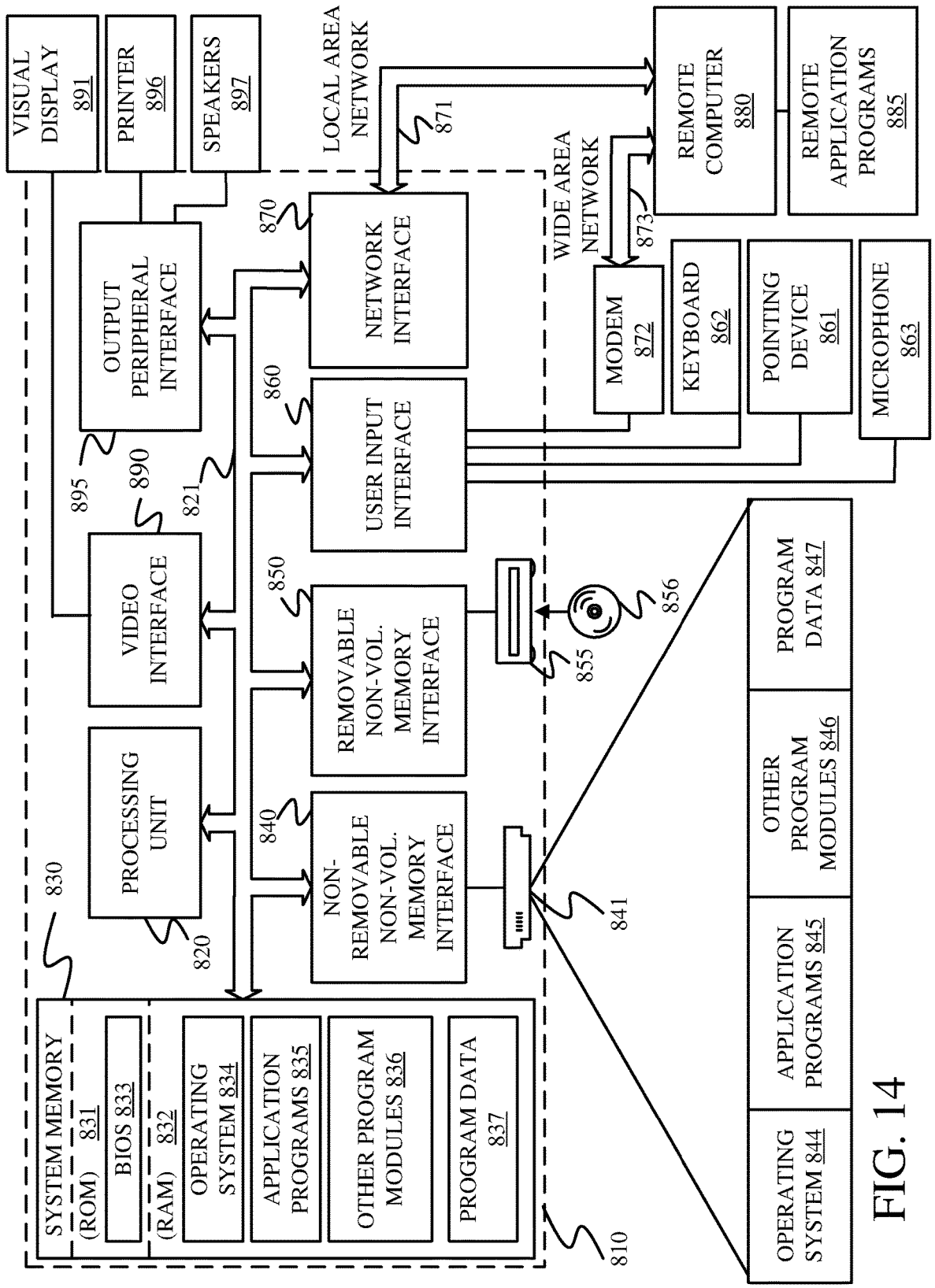
FIG. 14 is a block diagram showing one example of a computing environment that can be used in the architectures shown in the previous figures.

FIG. 14 is one example of a computing environment in which elements of FIGS. 3 and 8, or parts of it, (for example) can be deployed. With reference to FIG. 14, an example system for implementing some embodiments includes a computing device, configured to operate as described above, in the form of a computer 810. Components of computer 810 may include, but are not limited to, a processing unit 820 (which can comprise processors or servers from previous Figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIGS. 3 and 8 can be deployed in corresponding portions of FIG. 14.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 14 illustrates operating system 834, application programs 835, other program modules 836, and program data 837.

The computer 810 may also include other removable/non-removable volatile/nonvolatile computer storage media. By way of example only, FIG. 14 illustrates a hard disk drive 841 that reads from or writes to non-removable, nonvolatile magnetic media, nonvolatile magnetic disk 852, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 14, provide storage of computer readable instructions, data structures, program modules and other data for the computer 810. In FIG. 14, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN), or controller area network—CAN to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 14 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is an agricultural machine, comprising:
a controllable subsystem;
a check strip control system automatically controlling the controllable subsystem to change from performing a non-check strip operation, to performing a check strip operation, in a check strip in an agricultural field;
a start location identifier that detects a geographic location of a start of the check strip in the agricultural field based on the check strip control system changing the controllable subsystem to perform the check strip operation;

a non-check strip control system automatically controlling the controllable subsystem to change, from performing the check strip operation, to performing the non-check strip operation, in the agricultural field; and an end location identifier that detects a geographic location of an end of the check strip in the agricultural field based on the check strip control system changing the controllable subsystem to perform the non-check strip operation.

Example 2 is the agricultural machine of any or all previous examples and further comprising:

a check strip dimension identifier configured to obtain dimension information for the agricultural machine and identify a geographic location and dimension of the check strip in the agricultural field based on the dimension information and the geographic location of the start of the check strip and the geographic location of the end of the check strip.

Example 3 is the agricultural machine of any or all previous examples and further comprising:

a geographic location sensor that generates a location sensor signal indicative of a geographic location of the agricultural machine, the start location identifier and the end location identifier receiving the location sensor signal.

Example 4 is the agricultural machine of any or all previous examples and further comprising:

a check strip configuration system that receives a check strip data input that includes check strip data that defines the check strip operation, the check strip control system accessing the check strip data to control the controllable subsystem to perform the check strip operation.

Example 5 is the agricultural machine of any or all previous examples wherein the check strip configuration system comprises:

a check strip pattern identifier that receives a check strip pattern input indicative of a check strip pattern.

Example 6 is the agricultural machine of any or all previous examples and further comprising:

a check strip trigger detector detecting when to begin the check strip operation based on the check strip pattern and generating a check strip begin signal, the check strip control system controlling the controllable subsystem to perform the check strip operation based on the check strip begin signal.

Example 7 is the agricultural machine of any or all previous examples wherein the check strip control system comprises:

check strip data parsing logic configured to parse the check strip data to identify machine control characteristics corresponding to the check strip operation; and machine settings/configuration control logic configured to generate machine control signals to control the controllable subsystem to perform the check strip operation, based on the machine control characteristics in the check strip data.

Example 8 is the agricultural machine of any or all previous examples wherein the check strip control system comprises:

a check strip alignment identifier configured to determine whether the agricultural machine is aligned with a check strip in the agricultural field, and to generate an alignment signal indicative of the determination.

Example 9 is a method of controlling an agricultural machine, comprising:

automatically controlling, with one or more processors, a controllable subsystem of the agricultural machine to change from performing a non-check strip operation, to performing a check strip operation, in a check strip in an agricultural field;

detecting a geographic location of a start of the check strip in the agricultural field based on changing the controllable subsystem to perform the check strip operation;

automatically controlling, with the one or more processors, the controllable subsystem to change, from performing the check strip operation, to performing the non-check strip operation, in the agricultural field;

detecting a geographic location of an end of the check strip in the agricultural field based on changing the controllable subsystem to perform the non-check strip operation; and generating a start location output indicative of the geographic location of the start of the check strip and an end location output, indicative of the geographic location of the end of the check strip, for storage in a data store.

Example 10 is the method of any or all previous examples and further comprising:

obtaining dimension information for the agricultural machine; and identifying a geographic location and dimension of the check strip in the agricultural field based on the dimension information and the geographic location of the start of the check strip and the geographic location of the end of the check strip.

Example 11 is the method of any or all previous examples and further comprising:

generating, with a geographic location sensor, a location sensor signal indicative of a geographic location of the agricultural machine, wherein detecting the geographic location of the start of the check strip and detecting the geographic location of the end of the check strip are performed based on the location sensor signal.

Example 12 is the method of any or all previous examples and further comprising:

receiving a check strip data input that includes check strip data that defines the check strip operation.

Example 13 is the method of any or all previous examples wherein automatically controlling the controllable subsystem of the agricultural machine to change from performing a non-check strip operation, to performing a check strip operation comprises:

accessing the check strip data; and automatically controlling the controllable subsystem to perform the check strip operation based on the check strip data.

Example 14 is the method of any or all previous examples and further comprising:

receiving, at a check strip pattern identifier, a check strip pattern input indicative of a check strip pattern.

Example 15 is the method of any or all previous examples and further comprising:

detecting when to begin the check strip operation based on the check strip pattern; and generating a check strip begin signal, wherein automatically controlling the controllable subsystem to perform the check strip operation comprises controlling the controllable subsystem to perform the check strip operation based on the check strip begin signal.

Example 16 is the method of any or all previous examples wherein automatically controlling the controllable subsystem to perform the check strip operation comprises:

parsing the check strip data to identify machine control characteristics corresponding to the check strip operation; and generating machine control signals to control the controllable subsystem to perform the check strip operation, based on the machine control characteristics in the check strip data.

Example 17 is the method of any or all previous examples wherein automatically controlling the controllable subsystem to perform the check strip operation comprises:

determining whether the agricultural machine is aligned with a check strip in the agricultural field; and generating an alignment signal indicative of the determination.

Example 18 is a control system for controlling an agricultural machine, comprising:

one or more processors;

a check strip control system, implemented by the one or more processors, automatically controlling a controllable subsystem to change from performing a non-check strip operation, to performing a check strip operation, in a check strip in an agricultural field;

a start location identifier that detects a geographic location of a start of the check strip in the agricultural field based on the check strip control system changing the controllable subsystem to perform the check strip operation;

a non-check strip control system, implemented by the one or more processors, automatically controlling the controllable subsystem to change, from performing the check strip operation, to performing the non-check strip operation, in the agricultural field; and an end location identifier that detects a geographic location of an end of the check strip in the agricultural field based on the check strip control system changing the controllable subsystem to perform the non-check strip operation.

Example 19 is the control system of any or all previous examples and further comprising:

a check strip dimension identifier configured to obtain dimension information for the agricultural machine and identify a geographic location and dimension of the check strip in the agricultural field based on the dimension information and the geographic location of the start of the check strip and the geographic location of the end of the check strip.

Example 20 is the control system of any or all previous examples and further comprising:

a geographic location sensor that generates a location sensor signal indicative of a geographic location of the agricultural machine, the start location identifier and the end location identifier receiving the location sensor signal.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural machine, comprising:
   a controllable subsystem;
   a check strip control system automatically controlling the controllable subsystem to change from performing a non-check strip operation, to performing a check strip operation, in a check strip in an agricultural field;
   a start location identifier that detects a geographic location of a start of the check strip in the agricultural field based on the check strip control system changing the controllable subsystem to perform the check strip operation;
   a non-check strip control system automatically controlling the controllable subsystem to change, from performing the check strip operation, to performing the non-cheek strip operation, in the agricultural field;
   an end location identifier that detects a geographic location of an end of the check strip in the agricultural field based on the check strip control system changing the controllable subsystem to perform the non-check strip operation; and
   a check strip dimension identifier configured to obtain dimension information for the agricultural machine and identify a geographic location and dimension of the check strip in the agricultural field based on the dimension information for the agricultural machine and the geographic location of the start of the check strip and the geographic location of the end of the check strip.

2. The agricultural machine of claim 1 and further comprising:
   a geographic location sensor that generates a location sensor signal indicative of a geographic location of the agricultural machine, the start location identifier and the end location identifier receiving the location sensor signal.

3. The agricultural machine of claim 2 and further comprising:
   a check strip configuration system that receives a check, strip data input that includes check strip data that defines the check strip operation, the heck strip control system accessing the check strip data to control the controllable subsystem to perform the check strip operation.

4. The agricultural machine of claim 3 wherein the check strip configuration system comprises:
   a check strip pattern identifier that receives a check strip pattern input indicative of a check strip pattern.

5. The agricultural machine of claim 4 and further comprising:
   a check strip trigger detector detecting when to begin the check strip operation based on the check strip pattern and generating a check strip begin signal, the check strip control system controlling the controllable subsystem to perform the check strip operation based on the check strip begin signal.

6. The agricultural machine of claim 5 wherein the check strip control system comprises:
   check strip data parsing logic configured to parse the check strip data to identify machine control characteristics corresponding to the check strip operation; and
   machine settings/configuration control logic configured to generate machine control signals to control the controllable subsystem to perform the check strip operation, based on the machine control characteristics in the check strip data.

7. The agricultural machine of claim 5 wherein the check strip pattern indicates that a check strip is to be planted after a given number of passes and wherein the check strip trigger detector comprises a pass count detector configured to detect a count of a number of passes traveled by the agricultural machine and wherein the check strip trigger detector generates the check strip begin signal based on the check strip pattern and the count of the number of passes traveled by the agricultural machine.

8. A method of controlling an agricultural machine, comprising:
   automatically controlling, with one or more processors, a controllable subsystem of the agricultural machine to change from performing a non-check strip operation, to performing a check strip operation, in a check strip in an agricultural field;

detecting a geographic location of a start of the check strip in the agricultural field based on changing the controllable subsystem to perform the check strip operation;
automatically controlling, with the one or more processors, the controllable subsystem to change, from performing the check strip operation, to performing the non-check strip operation, in the agricultural field;
detecting a geographic location of an end of the check strip in the agricultural field based on changing the controllable subsystem to perform the non-check strip operation;
generating a start location output indicative of the geographic location of the start of the check strip and an end location output indicative of the geographic location of the end of the check strip, for storage in a data store;
obtaining dimension information for the agricultural machine; and
identifying a geographic location and dimension of the check strip in the agricultural field based on the dimension information for the agricultural machine and the geographic location of the start of the check strip and the geographic location of the end of the check strip.

9. The method of claim 8 and further comprising:
generating, with a geographic location sensor, a location sensor signal indicative of a geographic location of the agricultural machine, wherein detecting the geographic location of the start of the check strip and detecting the geographic location of the end of the check strip are performed based on the location sensor signal.

10. The method of claim 9 and further comprising:
receiving a check strip data input that includes check strip data that defines the check strip operation.

11. The method of claim 10 wherein automatically controlling the controllable subsystem of the agricultural machine to change from performing a non-check strip operation, to performing a check strip operation comprises:
accessing the check strip data; and
automatically controlling the controllable subsystem to perform the check strip operation based on the check strip data.

12. The method of claim 11 and further comprising:
receiving, at a check strip pattern identifier, a check strip pattern input indicative of a check strip pattern.

13. The method of claim 12 and further comprising:
detecting when to begin the check strip operation based on the check strip pattern; and
generating a check strip begin signal, wherein automatically controlling the controllable subsystem to perform the check strip operation comprises controlling the controllable subsystem to perform the check strip operation based on the check strip begin signal.

14. The method of claim 13 wherein automatically controlling the controllable subsystem to perform the check strip operation comprises:
parsing the check strip data to identify machine control characteristics corresponding to the check strip operation; and
generating machine control signals to control the controllable subsystem to perform the check strip operation, based on the machine control characteristics in the check strip data.

15. The method of claim 13 wherein the check strip pattern indicates that a check strip is to be planted after a given number of passes and wherein detecting when to begin the check strip operation based on the check strip pattern comprises:
detecting a count of a number of passes traveled by the agricultural machine.

16. A control system for controlling an agricultural machine, comprising:
one or more processors;
a check strip control system, implemented by the one or more processors, automatically controlling a controllable subsystem to change from performing a non-check strip operation, to performing a check strip operation, in a check strip in an agricultural field;
a start location identifier that detects a geographic location of a start of the check strip in the agricultural field based on the check strip control system changing the controllable subsystem to perform the check strip operation;
a non-check strip control system, implemented by the one or more processors, automatically controlling the controllable subsystem to change, from performing the check strip operation, to performing the non-check strip operation, in the agricultural field;
an end location identifier that detects a geographic location of an end of the check strip in the agricultural field based on the check strip control system changing the controllable subsystem to perform the non-check strip operation; and
a check strip dimension identifier configured to obtain dimension information for the agricultural machine and identify a geographic location and dimension of the check strip in the agricultural field based on the dimension information for the agricultural machine and the geographic location of the start of the check strip and the geographic location of the end of the check strip.

17. The control system of claim 16 and further comprising:
a geographic location sensor that generates a location sensor signal indicative of a geographic location of the agricultural machine, the start location identifier and the end location identifier receiving the location sensor signal.

18. The control system of claim 16 and further comprising:
a check strip pattern identifier that receives a check strip pattern input indicative of a check strip pattern; and
a check strip trigger detector detecting when to begin the check strip operation based on the check strip pattern and generating a check strip begin signal, the check strip control system controlling the controllable subsystem to perform the check strip operation based on the check strip begin signal.

19. The control system of claim 18 wherein the check strip pattern indicates that a check strip is to be planted after a given number of passes and wherein the check strip trigger detector comprises a pass count detector configured to detect a count of a number of passes traveled by the agricultural machine and wherein the check strip trigger detector generates the check strip begin signal based on the check strip pattern and the count of the number of passes traveled by the agricultural machine.

20. The control system of claim 16 and further comprising:
a check strip configuration system that receives a check strip data input that includes check strip data that defines the check strip operation, the check strip control system accessing the check strip data to control the controllable subsystem to perform the check strip operation.

21. An agricultural machine, comprising:
a controllable subsystem;
a check strip control system automatically controlling the controllable subsystem to change from performing a non-check strip operation, to performing a check strip operation, in a check strip in an agricultural field;
a start location identifier that detects a geographic location of a start of the check strip in the agricultural field based on the check strip control system changing the controllable subsystem to perform the check strip operation;
a non-check strip control system automatically controlling the controllable subsystem to change, from performing the check strip operation, to performing the non-check strip operation, in the agricultural field;
an end location identifier that detects a geographic location of an end of the check strip in the agricultural field based on the check strip control system changing the controllable subsystem to perform the non-check strip operation; and
a check strip alignment identifier configured to determine whether the agricultural machine is aligned with a check strip in the agricultural field and to generate an alignment signal indicative of the determination.

22. A method of controlling an agricultural machine, comprising:
determining whether the agricultural machine is aligned with a check strip in the agricultural field and generating an alignment signal indicative of the determination;
based on the alignment signal, automatically controlling, with one or more processors, a controllable subsystem of the agricultural machine to change from performing a non-check strip operation, to performing a check strip operation, in a check strip in an agricultural field;
detecting a geographic location of a start of the check strip in the agricultural field based on changing the controllable subsystem to perform the check strip operation;
automatically controlling, with the one or more processors, the controllable subsystem to change, from performing the check strip operation, to performing the non-check strip operation, in the agricultural field;
detecting a geographic location of an end of the check strip in the agricultural field based on changing the controllable subsystem to perform the non-check strip operation; and
generating a start location output indicative of the geographic location of the start of the check strip and an end location output indicative of the geographic location of the end of the check strip, for storage in a data store.

* * * * *